United States Patent
Oe et al.

(10) Patent No.: US 8,185,753 B2
(45) Date of Patent: May 22, 2012

(54) STORAGE MEDIUM FOR STORING POWER CONSUMPTION MONITOR PROGRAM, POWER CONSUMPTION MONITOR APPARATUS AND POWER CONSUMPTION MONITOR METHOD

(75) Inventors: Kazuichi Oe, Kawasaki (JP); Tatsuo Kumano, Kawasaki (JP); Yasuo Noguchi, Kawasaki (JP); Yoshihiro Tsuchiya, Kawasaki (JP); Kazutaka Ogihara, Kawasaki (JP); Masahisa Tamura, Kawasaki (JP); Tetsutaro Maruyama, Kawasaki (JP); Takashi Watanabe, Kawasaki (JP); Minoru Kamoshida, Kawasaki (JP); Shigeyuki Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 557 days.

(21) Appl. No.: 12/343,491

(22) Filed: Dec. 24, 2008

(65) Prior Publication Data
US 2009/0198385 A1 Aug. 6, 2009

(30) Foreign Application Priority Data
Dec. 26, 2007 (JP) ................................. 2007-333970

(51) Int. Cl.
G06F 1/26 (2006.01)
G06F 1/28 (2006.01)
G06F 1/32 (2006.01)
G06F 11/30 (2006.01)

(52) U.S. Cl. ........ 713/300; 713/310; 713/320; 713/323; 713/324; 713/340; 714/1; 714/2; 700/286; 700/291; 700/295; 700/297

(58) Field of Classification Search .................. 713/300, 713/310, 320–324, 330, 340; 700/286, 291, 700/295–298; 714/1, 2
See application file for complete search history.

(56) References Cited

U.S. PATENT DOCUMENTS

| 5,834,855 | A | 11/1998 | Chiba | |
|---|---|---|---|---|
| 6,513,124 | B1 | 1/2003 | Furuichi et al. | |
| 7,349,828 | B1 * | 3/2008 | Ranganathan et al. | ........ 702/186 |
| 8,041,521 | B2 * | 10/2011 | Bletsch et al. | ................... 702/60 |
| 8,041,967 | B2 * | 10/2011 | Belady et al. | ................. 713/320 |
| 2005/0044429 | A1 * | 2/2005 | Gaskins et al. | ............... 713/300 |

(Continued)

FOREIGN PATENT DOCUMENTS

JP 6-153407 5/1994

(Continued)

OTHER PUBLICATIONS

Japan Patent Office, Office Action mailed Nov. 9, 2010 for correspondent JP Patent Application No. 2007-333970, with partial English-translation provided.

(Continued)

*Primary Examiner* — Fahmida Rahman
(74) *Attorney, Agent, or Firm* — Fujitsu Patent Center

(57) ABSTRACT

A power consumption monitor device monitors power consumption of one or more devices through a network. The monitor device includes a storage unit, a load information collecting unit and a power consumption estimation unit. The storage unit stores power consumption estimation information indicating a relation between power consumption and processing load of the one or more devices. The load information collecting unit collects load information indicating the processing load of the one or more devices through the network to the monitor device. The power consumption estimation unit estimates power consumption of the one or more device based on the collected load information and the power consumption estimation information.

16 Claims, 20 Drawing Sheets

U.S. PATENT DOCUMENTS

| | | | |
|---|---|---|---|
| 2005/0144489 A1* | 6/2005 | Tanikawa | 713/300 |
| 2006/0288241 A1* | 12/2006 | Felter et al. | 713/300 |
| 2007/0101188 A1* | 5/2007 | Lin | 714/6 |
| 2007/0283178 A1* | 12/2007 | Dodeja et al. | 713/324 |
| 2007/0288774 A1 | 12/2007 | Tanaka | |
| 2007/0300083 A1* | 12/2007 | Goodrum et al. | 713/300 |

FOREIGN PATENT DOCUMENTS

| | | |
|---|---|---|
| JP | 8-182194 A | 7/1996 |
| JP | H09-251334 | 9/1997 |
| JP | 11-353052 | 12/1999 |
| JP | 2002-142385 | 5/2002 |
| JP | 2003-291753 | 10/2003 |
| JP | 2005-323438 | 11/2005 |
| JP | 2007-330016 | 12/2007 |

OTHER PUBLICATIONS

Akira, Ishikawa, "Japanese Office Action" mailed by JPO and corresponding to Japanese application No. 2007-333970 on Nov. 10, 2009, with English translation.

* cited by examiner

| CPU DUTY CYCLE (%) | POWER CONSUMPTION (W) |
|---|---|
| 0 | 200 |
| 10 | 213 |
| 20 | 226 |
| 30 | 239 |
| 40 | 252 |
| 50 | 265 |
| 60 | 278 |
| 70 | 291 |
| 80 | 304 |
| 90 | 317 |
| 100 | 330 |

| NUMBER OF ACCESSES PER UNIT TIME (iops) | POWER CONSUMPTION (W) |
|---|---|
| 0 | 0 |
| UP TO 100 | 10 |
| UP TO 200 | 20 |
| UP TO 1000 | 25 |
| UP TO 2000 | 30 |

| NUMBER OF ACCESSES PER UNIT TIME (iops) | POWER CONSUMPTION (W) |
|---|---|
| 0 | 150 |
| UP TO 100 | 170 |
| UP TO 200 | 180 |
| UP TO 1000 | 200 |
| UP TO 2000 | 220 |

| COMMUNICATION DATA TRAFFIC PER UNIT TIME (Mbps) | POWER CONSUMPTION (W) |
|---|---|
| UP TO 100 | 2 |
| UP TO 500 | 5 |
| UP TO 1000 | 10 |

FIG. 15

| | POWER TAP 1 | POWER TAP 2 |
|---|---|---|
| RECEPTACLE 1 | PC1 | PC3 |
| RECEPTACLE 2 | PC2 | PC4 |
| RECEPTACLE 3 | RAID1 | |
| RECEPTACLE 4 | RAID2 | |

| POWER TAP 1 | POWER TAP 2 |
|---|---|
| 2000 W | 2000 W |

| NODE NAME | NUMBER OF CONTINUOUS RESPONSE FAILURES |
|---|---|
| PC1 | 0 |
| PC2 | 1 |
| PC3 | 0 |
| PC4 | 4 |

172

| NODE NAME | IMMEDIATELY PRECEDING INFORMATION | SECOND PRECEDING INFORMATION | THIRD PRECEDING INFORMATION | FOURTH PRECEDING INFORMATION |
|---|---|---|---|---|
| PC1 (W/RAID) | 20/100 | 15/90 | 22/110 | 20/100 |
| PC2 (W/RAID) | 90/100 | 90/90 | 90/110 | 90/100 |
| PC3 | 10/50 | 10/50 | 8/40 | 10/50 |
| PC4 | 5/30 | 5/30 | 5/30 | 5/30 |

CPU DUTY CYCLE (%)/COMMUNICATION DATA TRAFFIC (bps)

FIG. 25
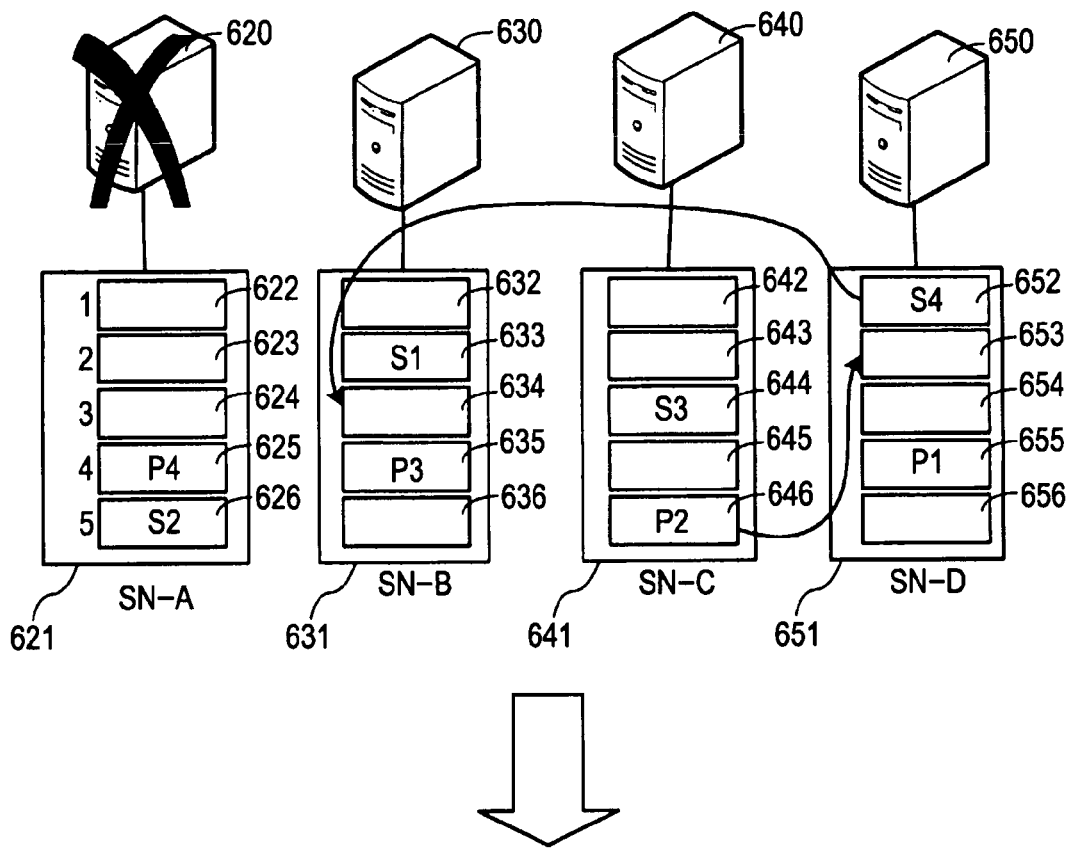
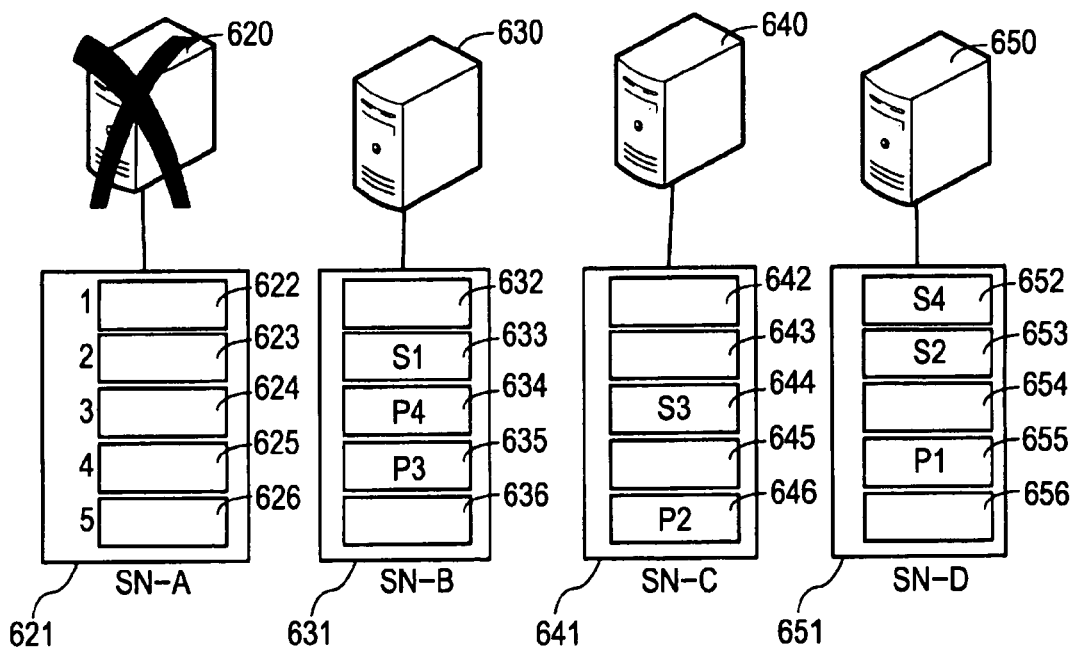

STORAGE MEDIUM FOR STORING POWER CONSUMPTION MONITOR PROGRAM, POWER CONSUMPTION MONITOR APPARATUS AND POWER CONSUMPTION MONITOR METHOD

CROSS-REFERENCE TO RELATED APPLICATIONS

This application claims the benefit of priority from Japanese Patent Application No. 2007-333970 filed on Dec. 26, 2007, which is herein incorporated by reference in its entirety.

BACKGROUND

1. Field

Embodiments of the present invention relate to a method, device and computer-readable recording medium for monitoring the power consumption of one or more electronic devices.

2. Description of Related Art

The introduction of large-scale computer system generally requires power equipment sufficient to supply stable electric power to each electric device of the computer system. Each electric device may be supplied with power from a power distribution network arranged in a building installed with a computer system, for example. Each electric device may be connected to the power distribution network via a plug at the forward end of the power cable of each electric device. The plug may be inserted into the receptacle (plug socket) of a power tap connected to the power distribution network.

The power tap may include a plurality of receptacles for establishing a connection with the electric devices. Power taps generally have a rated power. The rated power is generally defined as the maximum value of the power that may be continuously supplied. The total power consumption of the electric devices connected to each power tap is generally required not to exceed the rated power. The number of the electric devices, such as a server, for example, that can be connected to each power tap is generally determined based on the total rated power consumption of the electric devices.

However, an electric device, such as a server, for example, does not always consume the rated power. In the case where the power equipment is prepared on the assumption that all the electric devices operate simultaneously with the rated power, therefore, an excessive power equipment is required. Thus, a technique is desired whereby the power consumed simultaneously by the one or more electric devices connected to a power tap is controlled not to exceed the rated power of the corresponding power tap. Specifically, each electric device rarely consumes the rated power all the time during operation, and therefore, the number of electric devices that can be connected may be increased by controlling the maximum power consumption of the electric devices.

Accordingly, a first related technique has been conceived wherein a sensor node predicts the maximum power demand and outputs the power alarm information based on the prediction. In the first related technique, power consumption is controlled by a control node that has received the power alarm information. By implementing the first related technique, electric devices, of which the total value of the rated power consumption of the electric devices exceed the maximum rated power of the power tap, can be connected to the power tap.

A second related technique has also been conceived to predict the consumed current value based on information indicating the operation or non-operation of an electric load mounted on a vehicle and a consumed current value data table indicating the value of the current consumed by each electric load. Accordingly, the second related technique makes it possible to predict the consumed current value simply by detecting the operation or non-operation of each electric device.

The application of the aforementioned first and second related techniques to monitor the power consumption for each power tap of a large-scale computer system, however, is not efficient and/or realistic. For example, according to the first related technique, every power tap is required to be equipped with a wattmeter, which increases cost. Further, the power consumption of each computer of a computer system dynamically changes according to the data processing situation of the computer.

According to the second related technique, which does not require a wattmeter, a value of an entire amount of consumed current is predicted assuming that the consumed current value of the electric load is constant. However, as noted above, power consumption of electric devices of a computer system dynamically changes during operation, and the second related technique does not consider or address the dynamic changes in power consumption.

SUMMARY

Examples of embodiments of the present invention provide a technique capable of estimating the power consumption of each electric device, which may dynamically change with time, without installing the wattmeter on each electric device.

At least one embodiment of the present invention provides a power consumption monitor device that monitors a power consumption of an electric device through a network. The monitor device includes a storage unit, a load information collecting unit and a power consumption estimation unit. The storage unit stores power consumption estimation information indicating a relation between power consumption and processing load of the one or more devices. The load information collecting unit collects load information indicating the processing load of the one or more devices through the network to the monitor device. The power consumption estimation unit estimates power consumption of the one or more device based on the collected load information and the power consumption estimation information.

It is to be understood that both the foregoing summary description and the following detailed description are explanatory as to some embodiments of the present invention, and not restrictive of the present invention as claimed.

BRIEF DESCRIPTION OF THE DRAWINGS

Embodiments are illustrated by way of example and not limited by the following figures.

FIG. 11 is an example power consumption conversion table for a CPU according to an example of an embodiment of the present invention.

FIG. 12 is an example power consumption conversion table for a built-in disk according to an example of an embodiment of the present invention.

FIG. 13 is an example of a power consumption conversion table for the RAID according to an example of an embodiment of the present invention.

FIG. 14 is an example of a power consumption conversion table for an NIC according to an example of an embodiment of the present invention.

FIG. 15 is an example of a table including information on electrical devices connected to power taps according to an example of an embodiment.

FIG. 16 is an example of a table including power consumption information according to an example of an embodiment of the present invention.

FIG. 20 depicts an example of information managed by a fault monitor unit according to an example of an embodiment of the present invention.

FIG. 25 depicts a data restoration process at the time of a fault according to an example of an embodiment of the present invention.

DETAILED DESCRIPTION OF EXAMPLES OF EMBODIMENTS

Figure 1:
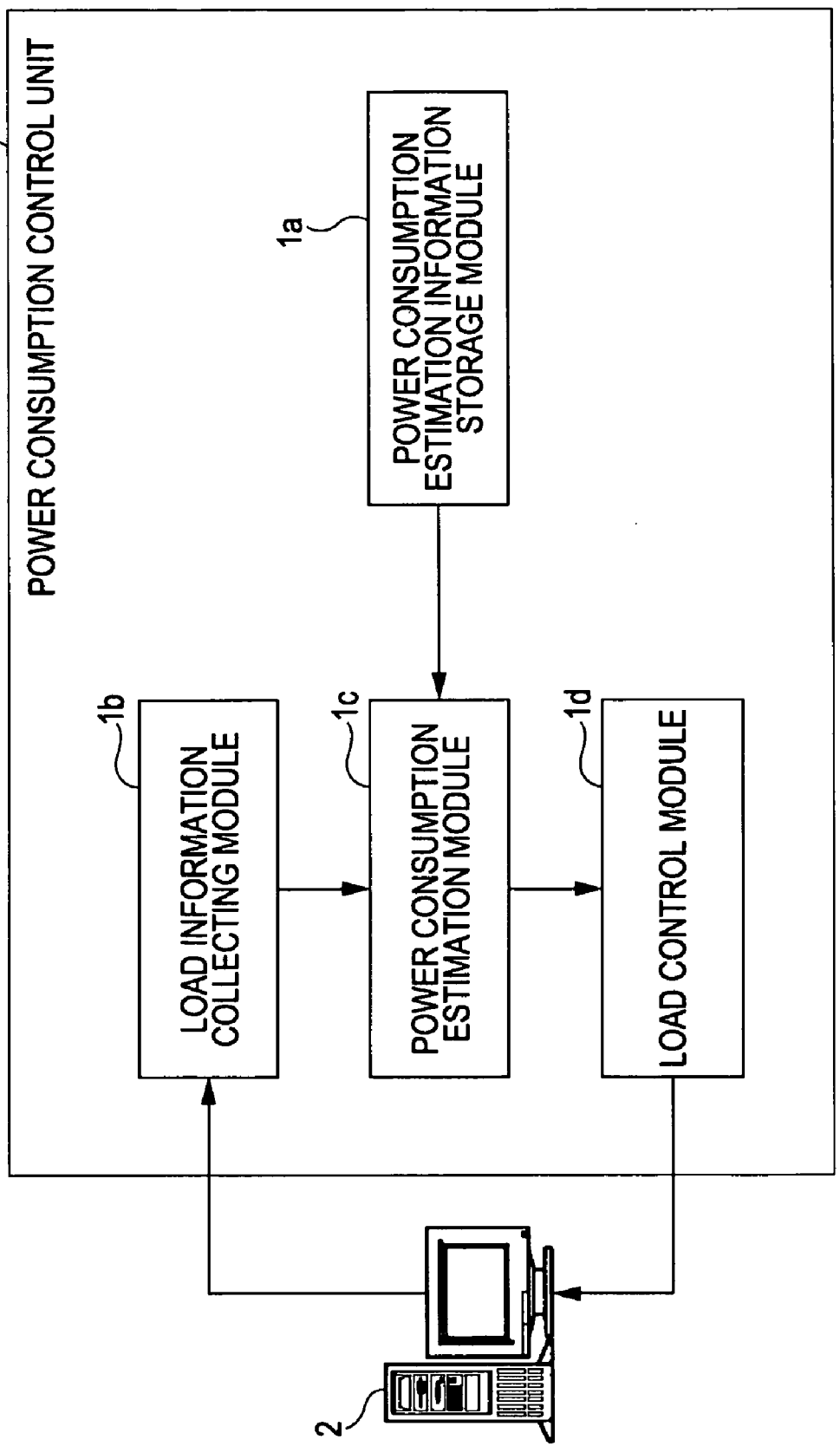
FIG. 1 depicts a system according to an example of an embodiment of the present invention.

In the figures, dimensions and/or proportions may be exaggerated for clarity of illustration. It will also be understood that when an element is referred to as being "connected to" another element, it may be directly connected or indirectly connected, i.e., intervening elements may also be present. Like reference numerals refer to like elements throughout.

FIG. 1 depicts a system for monitoring and controlling power consumption of an electric device. Referring to FIG. 1, a power consumption control unit 1 includes a power consumption estimation information storage module 1a, a load information collecting module 1b, a power consumption estimation module 1c and a load control module 1d.

The power consumption estimation information storage module 1a stores power consumption estimation information indicating the power consumption corresponding to the processing load of an electric device 2. The power consumption estimation information storage module 1a stores, as the power consumption estimation information, for example, the power consumption corresponding to the information on a typical processing load of the electric device 2. In the case where the electric device 2 is a computer, the information on the processing load may be referred to as the CPU duty cycle, for example. Also, the power consumption estimation information storage module 1a may store the power consumption estimation information. The power consumption estimation information indicating the power consumption corresponding to the processing load for each component of the electric device 2.

The load information collecting module 1b acquires load information indicating the processing load of the electric device 2 connected to the computer through a network. The load information collecting module 1b acquires, for example, the load information for a typical processing load of the electric device 2. The load information collecting module 1b may also acquire load information indicating the processing load of each component of the electric device 2.

The power consumption estimation module 1c estimates the power consumption of the electric device 2. The power consumption estimation module may estimate the power consumption of the electric device 2 based on the load information collected by the load information collecting module 1b with reference to the power consumption estimation information storage module 1a. In the case where the load information for the typical processing load of the electric device 2 is collected, for example, the power consumption estimation module 1c estimates the power consumption based on the power consumption estimation information indicating the power consumption corresponding to the typical processing load. In the case where the load information is collected for each component of the electric device 2, the power consumption estimation module 1c may determine the power consumption of each component based on the load information for each component, and sums the power consumption of the component to obtain the total power consumption of the electric device 2.

If the power consumption of the electric device 2 is determined to be larger than a threshold value, the load control module 1d reduces the processing load of the electric device 2. For example, if the electric device 2 is a disk node for inputting/outputting data in accordance with an access request through a network, the load control module 1d limits the number of accesses to the electric device 2 per unit time to a specified number or less if the power consumption of the electric device 2 is larger than the threshold value.

In the power consumption monitor unit 1 shown in FIG. 1, the load information is acquired from the electric device 2. Then, the power consumption of the electric device 2 corresponding to the load information may be estimated based on the power consumption estimation information indicating the power consumption corresponding to the processing load of the electric device 2. The system shown in FIG. 1 does not include a wattmeter installed for the electric device 2, therefore, the power consumption of the electric device 2 in which the power consumption may change with time may be estimated whenever desired and/or required without the use of a wattmeter installed for the electric device 2. Also, the power consumption of the electric device 2, if excessively increased, may be reduced by reducing the load of the electric device 2 to reduce the power consumption to below a threshold value.

Using the technique described above, the power consumption management is facilitated for each receptacle of one or more power taps of a system. In the example described below with respect to FIG. 2, the power consumption is managed for each power tap unit of a computer system in which power is supplied to a electric device, such as a computer, for example, through a power tap having a plurality of receptacles.

Figure 2:
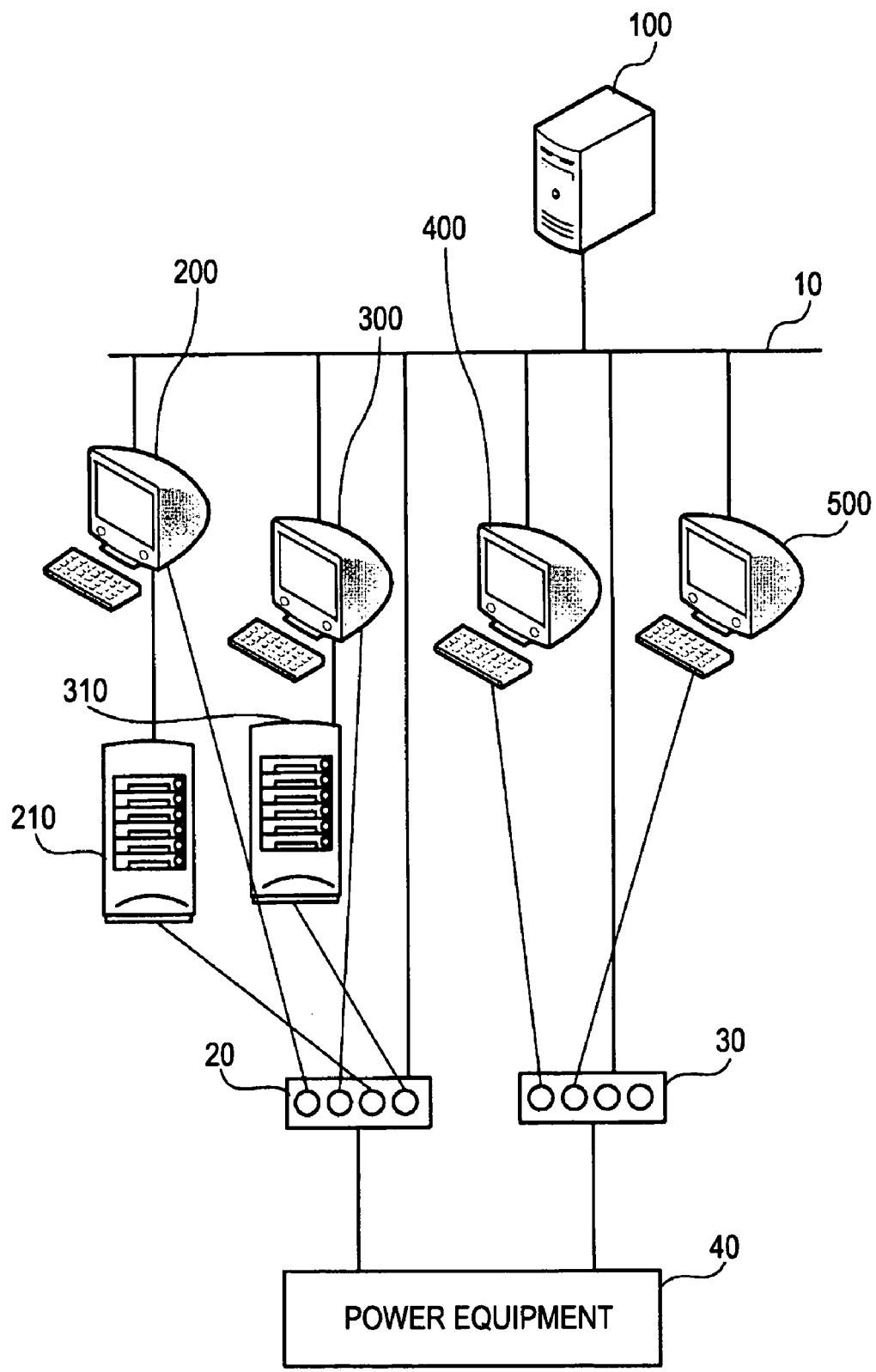
FIG. 2 depicts a system according to an example of an embodiment of the present invention.

FIG. 2 depicts a system for monitoring and controlling power consumption of one or more electric devices. In FIG. 2, a power consumption monitor server 100 is connected with a plurality of computers 200, 300, 400, 500 and a plurality of power taps 20, 30 through a network 10. The computers 200, 300, 400, 500 execute various data processing operations in response to processing requests input by a user operation or through the network 10.

The computers 200, 300 are connected with RAIDs (Redundant Array of Independent Disks) 210, 310, respectively. The RAIDs 210, 310 may include a plurality of hard disk drives (HDD) and provide data storage using the technique such as RAID 5 (striping with parity).

The power taps 20, 30 are connected to power equipment 40. The power equipment 40 supplies the power to the power taps 20, 30. The power equipment 40 may supply a desired and/or predetermined voltage to the power taps 20, 30. The power taps 20, 30 each have a plurality of receptacles (power plug sockets) into which power plugs of the computers 200, 300, 400, 500 and the RAIDs 210, 310 are inserted. The power tap 20 is connected with the two computers 200, 300 and the two RAIDs 210, 310. The power tap 30 is connected with the two computers 400, 500. Also, the power taps 20, 30 may shut off the power supply to one or more of the receptacles based on a command input thereto through the network 10.

The power consumption monitor server 100 estimates the power consumption based on the load information of the computers 200, 300, 400, 500. The power consumption monitor server 100 estimates the power consumption of each of the electric devices connected to each of the power taps 20, 30, and in the case where the power consumption of a connected electric device is excessively large, reduces the processing load of the particular electric device. Also, the power consumption monitor server 100, upon detection of a fault of any of the computers, may forcibly stop operations of the particular computer through the network.

Figure 3:
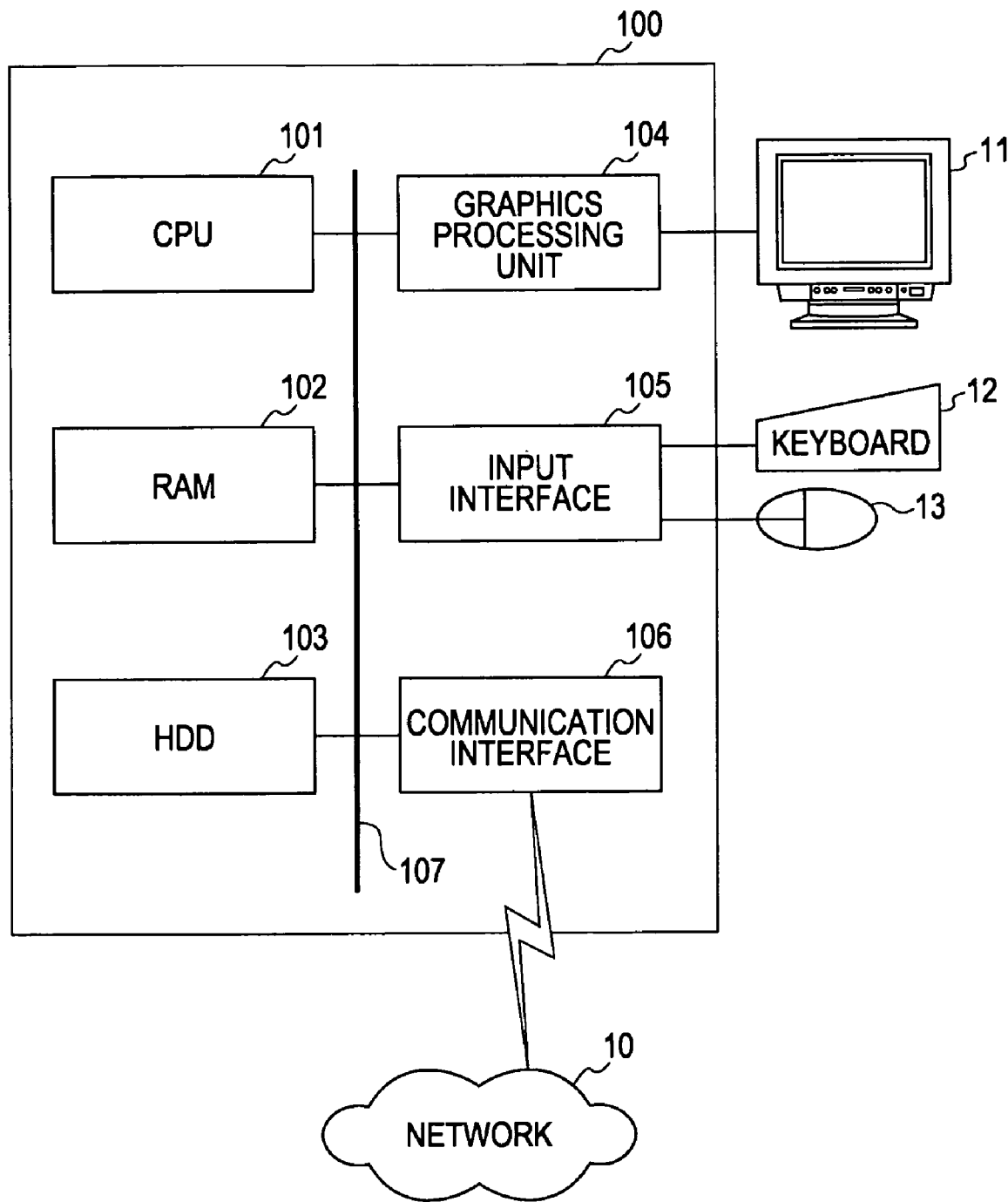
FIG. 3 depicts an example hardware configuration of a computer included in a system according to an example of an embodiment of the present invention.

FIG. 3 depicts an example hardware configuration of a computer included in the system for monitoring and controlling power consumption of one or more electric devices. The power consumption monitor server 100 is controlled by a CPU (central processing unit) 101. The CPU 101 is connected with a RAM (random access memory) 102, a HDD (hard disk drive) 103, a graphics processing unit 104, an input interface 105 and a communication interface 106 through a bus 107.

The RAM 102 stores at least a part of an application program or a program of the OS (operating system) executed by the CPU 101. Also, the RAM 102 stores the various data required for operations executed by the CPU 101. The HDD 103 stores the OS and the application program.

The graphics processing unit 104 is connected with a monitor 11. The graphics processing unit 104, in response to a command from the CPU 101, displays an image on the screen of the monitor 11. The input interface 105 is connected with a keyboard 12 and a mouse 13, for example. In the input interface 105, the signal sent from the keyboard 12 or the mouse 13 is transmitted to the CPU 101 through the bus 107.

The communication interface 106 is connected to the network 10. The communication interface 106 transmits and receives the data to and from the other computers through the network 10. It should be appreciated that the computers 200, 300, 400, 500 may include a similar hardware.

Figure 4:
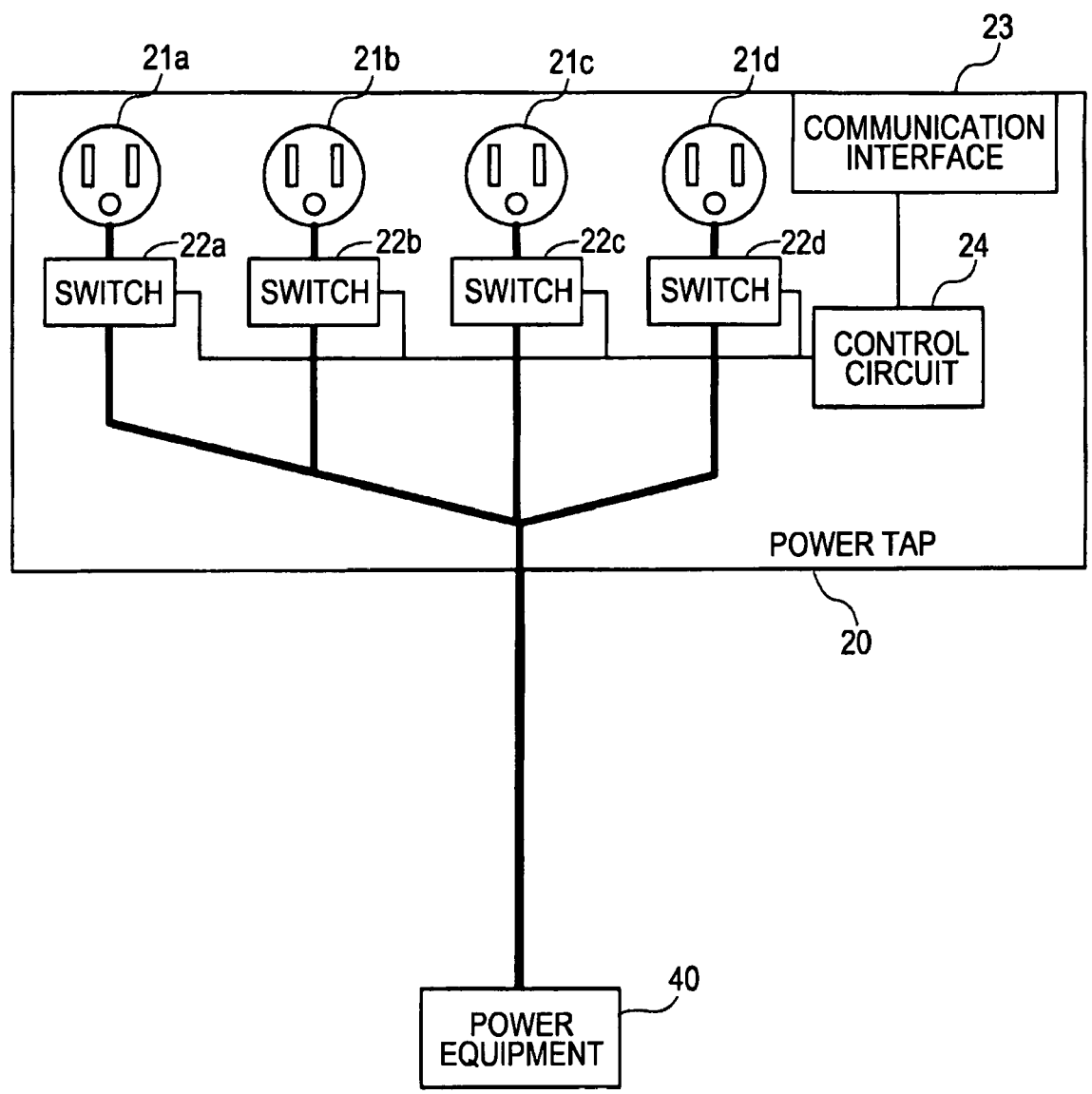
FIG. 4 depicts a power tap according to an example of an embodiment of the present invention.

FIG. 4 depicts the internal structure of the power tap. The power tap 20 includes a plurality of receptacles 21a, 21b, 21c, 21d. The receptacles 21a, 21b, 21c, 21d are connected to the power equipment 40 through corresponding switches 22a, 22b, 22c, 22d, respectively. The switches 22a, 22b, 22c, 22d switch on/off the power supply to the receptacles 21a, 21b, 21c, 21d, respectively. The switches 22a, 22b, 22c, 22d may be controlled in accordance with the control signal from the control circuit 24.

The communication interface 23 establishes data communication with the power consumption monitor server 100 through the network 10. The communication interface 23 delivers the processing request from the power consumption monitor server 100 to the control circuit 24.

The control circuit 24 controls the on/off operation of the switches 22a, 22b, 22c, 22d. The control circuit 24 may control the on/off operation of the switches 22a, 22b, 22c, 22d based on a command sent from the power consumption monitor server 100. Specifically, the control circuit 24, upon receipt of a power shutoff command designating receptacle from the power consumption monitor server 100, outputs a power shutoff signal to the switch corresponding to the designated receptacle. The switch that has received this signal shuts off the power supply to the particular receptacle.

The power tap 20 with the internal structure depicted in FIG. 4 may forcibly shut off the power supply to a computer that has developed a fault, which is connected to the power tap 20. The other power tap 30 also has an internal structure similar to that of the power tap 20 shown in FIG. 4.

Figure 5:
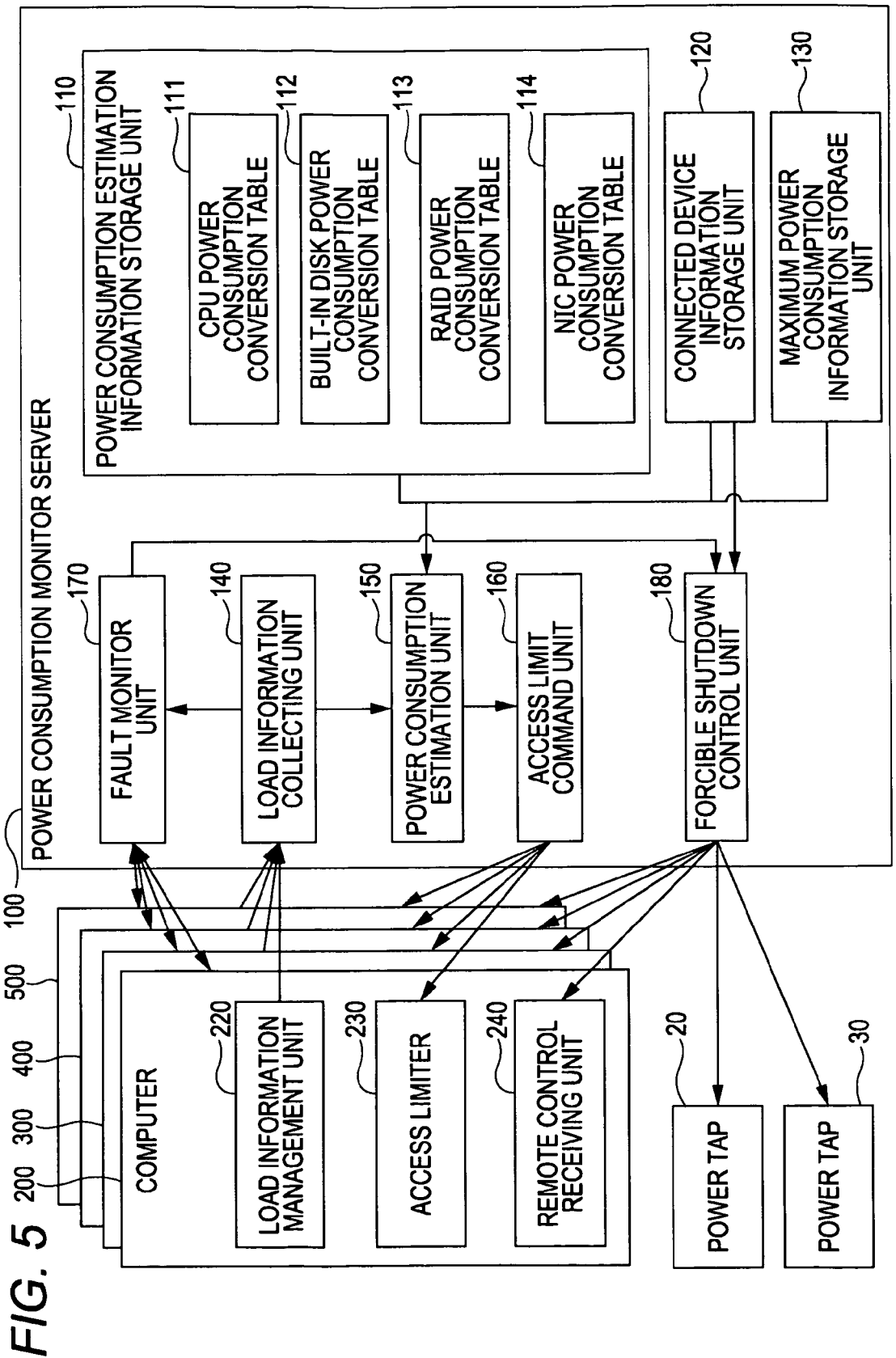
FIG. 5 depicts a system according to an example of an embodiment of the present invention.

FIG. 5 depicts operations of a system related to controlling power consumption. The power consumption monitor server 100 includes a power consumption estimation information storage unit 110, a connected device information storage unit 120, a maximum power consumption information storage unit 130, a load information collecting unit 140, a power consumption estimation unit 150, an access limit command unit 160, a fault monitor unit 170 and a forcible shutdown control unit 180.

The power consumption estimation information storage unit 110 relates to storing information for estimating the power consumption based on the load information of the computers 200, 300, 400, 500. For example, a part of the storage area of the HDD 103 may be used as the power consumption estimation information storage unit 110. The power consumption estimation information storage unit 110 stores therein a CPU power consumption conversion table 111, a built-in disk power consumption conversion table 112, a RAID power consumption conversion table 113 and a NIC (network interface card) power consumption conversion table 114, for example.

The CPU power consumption conversion table 111 includes conversion values of the power consumption corresponding to the load of the CPU and the RAM, for example. The built-in disk power consumption conversion table 112 includes a conversion value of the power consumption corresponding to the frequency of access to the built-in disk of the computer, for example. The RAID power consumption conversion table 113 includes a conversion value of the power consumption corresponding to the frequency of access to the RAID connected to the computer, for example. The NIC power consumption conversion table 114 includes a conversion value of the power consumption corresponding to the communication traffic (bit rate) of the communication interface in the computer, for example.

The connected device information storage unit 120 relates to storing information corresponding to and/or identifying the devices connected to the power taps 20, 30. A part of the storage area of the HDD 103, for example, may be used as the connected device information storage unit 120.

The maximum power consumption information storage unit 130 relates to storing information indicating the maximum power consumption of each of the power taps 20, 30. The maximum power consumption is a threshold value providing a criterion to determine whether the power supplied from the power taps 20, 30 is to be suppressed by decreasing the processing load of a computer, for example. A part of the storage area of the HDD 103 may be used as the maximum power consumption information storage unit 130, for example.

The load information collecting unit 140 relates to collecting load information from the computers 200, 300, 400, 500. The load information may include the CPU duty cycle, the number of accesses to the built-in disk per unit time, the number of accesses to the RAID per unit time and the communication data traffic per unit time through the network 10. The load information collecting unit 140 delivers the collected load information to the power consumption estimation unit 150. The load information collecting unit 140, upon acquisition of the load information from the computers 200, 300, 400, 500, delivers the acquired load information to the fault monitor unit 170.

The power consumption estimation unit 150 relates to estimating the power consumption of each power tap based on the load information received from the load information collecting unit 140. Specifically, the power consumption estimation unit 150 estimates the power consumption of each component of the computer and the power consumption of the RAID based on the load information of each computer by reference to the information stored in the power consumption estimation information storage unit 110. Then, the power consumption estimation unit 150 estimates the total power consumption of the computer components as the power consumption of the computer. The power consumption estimation unit 150, by referring to the connected device information storage unit 120, determines the devices connected to each power tap and estimates the power consumption for one or more electric devices connected to each power tap.

The power consumption estimation unit 150, after estimating the power consumption of each power tap, accesses the maximum power consumption information storage unit 130 and judges whether the power consumption of each power tap exceeds the maximum power consumption. If one or more devices connected to any of the power taps exceed the maximum power consumption, the power consumption estimation unit 150 notifies the access limit command unit 160. The notification may include an identification number of the computer connected to a corresponding power tap.

The access limit command unit 160, upon receipt of the notification from the power consumption estimation unit 150, transmits an access limit request to the corresponding computer. The notification may include an identification number of the corresponding computer, for example.

The fault monitor unit 170 confirms whether the computers 200, 300, 400, 500 are operating normally or not. The fault monitor unit 170 may judge whether the computers 200, 300, 400, 500 are operating normally or not, for example, by determining whether the load information is being received periodically. The fault monitor unit 170, upon detection of an inoperative computer, delivers the identification information of the detected inoperative computer to the forcible shutdown control unit 180.

The forcible shutdown control unit 180, upon receipt of the computer identification information from the fault monitor unit 170, forcibly shuts down the identified computer. For example, the forcible shutdown control unit 180 remotely accesses the computer to be forcibly shut down and transmits a shutdown command to the computer. In the case where the computer cannot be shut down normally, the forcible shutdown control unit 180 refers to the connected device information storage unit 120 and acquires the identification of the power tap connected with the computer to be forcibly shut down and the number of the receptacle connected to the computer. The forcible shutdown control unit 180 then instructs the power tap connected to the computer to be forcibly shut down to shut off the power supply from the receptacle connected with the computer.

Still referring to FIG. 5, the computer 200 includes a load information management unit 220, an access control unit 230 and a remote control receiving unit 240. The load information management unit 220 transmits the load information of the computer 200 periodically to the power consumption monitor server 100. Incidentally, the load information of the computer 200 may be acquired through the system management function packaged in the OS.

An access limiter 230 limits the number of accesses per unit time through the network 10 upon receipt of an access limit request from the power consumption monitor server 100. For example, the memory managed by the access limiter 230 stores therein the number of accesses per unit time permitted in an access limit mode. The access limiter 230, in response to an access limit request, limits the number of accesses per unit time to the number stored in the memory. In other words, the access limiter 230, upon receipt of an access limit command and as soon as the access requests through the network 10 reaches the number permitted for a given unit time, delays and/or stops the process of addressing the access requests received through the network 10 for a time duration. Upon lapse of the time duration, the addressing the access requests received through the network 10 is resumed.

The remote control receiving unit 240 receives the remote operation through the network 10. The remote control receiving unit 240 receives, for example, a remote log-in through the network 10 from the power consumption monitor server 100. Upon receipt of a shutdown command from the power consumption monitor server 100, the remote control receiving unit 240 executes the shutdown command.

Next, the contents of the data stored in the power consumption monitor server 100 are described. First, a method of calculating the power consumption estimation information is explained. The method described below includes grouping components of a computer into groups in order to estimate the power consumption.

Figure 6:
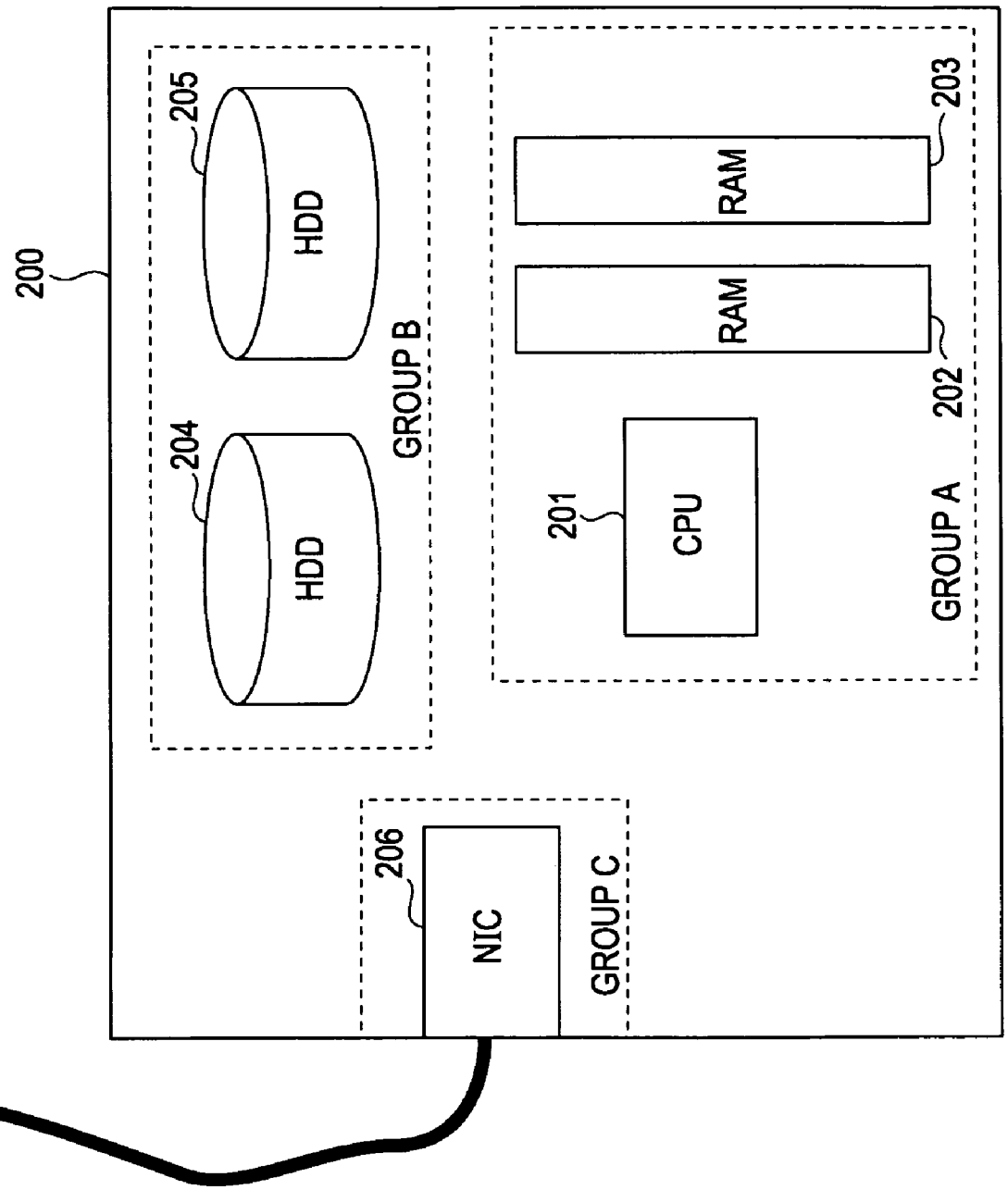
FIG. 6 depicts an example of a grouping of components of a computer used for estimating the power consumption according to an example of an embodiment of the present invention.

FIG. 6 depicts an example of grouping components of an electric device for power consumption estimation. For example, of the components consuming power in the computer 200, the CPU 201 and the RAMs 202, 203 are grouped into a group (group A). The HDDs 204, 205 are grouped into another group (group B). Also, the communication interface (NIC) is regarded as yet another group (group C).

The power consumption of the computer 200 varies depending on what kind of operation or application software (hereinafter referred to simply as "application") is being executed. For example, an application A in which data input/output to and from the HDDs 204, 205 is relatively small and arithmetic operations performed by the CPU 201 is great, the power consumption of the group A mainly increases. In an application B in which data input/output to and from the HDDs 204, 205 frequently occurs, the power consumption of the group B generally increases in response to operations relating to application B more than the power consumption of groups A or C. In an application C in which the communication through the network 10 is relatively large, the power consumption of the group C generally increases more than the power consumptions of groups A or B.

The power consumption may be estimated, therefore, by grasping the degree to which each group is used. The power consumption of the group A may be considered dependent on the CPU duty cycle, and that the power consumption of group B may be considered dependent on the number of accesses to the disk per unit time (one second) (disk iops), for example. Also, the power consumption of the group C may be considered dependent on the communication data traffic in bit rate (network bps) per unit time (one second), for example.

During the operation of the computer 200, the components of the respective groups are used in a mixed fashion. Thus, the total power consumption of the groups A, B, C may be determined as the power consumption of the computer 200.

In order to prepare the power consumption estimation information, therefore, a benchmark operation may be performed in advance. In the benchmark operation, an application and/or operations having a large effect on the power consumption of each group is executed by the computer 200, and the power consumption of the computer 200 running the application and/or performing operations related to the application is measured. The measurements may be performed with a wattmeter, for example.

First, a user may perform the benchmark operation for the application A which mainly uses the CPU 201 and the RAMs 202, 203 included in the group A. For example, the user causes the computer 200 to execute the application A and acquires the CPU duty cycle from the OS, while at substantially the same time measuring the power consumption of the computer 200. The power consumption corresponding to the CPU duty cycle is acquired by gradually increasing the CPU duty cycle.

Figure 7:
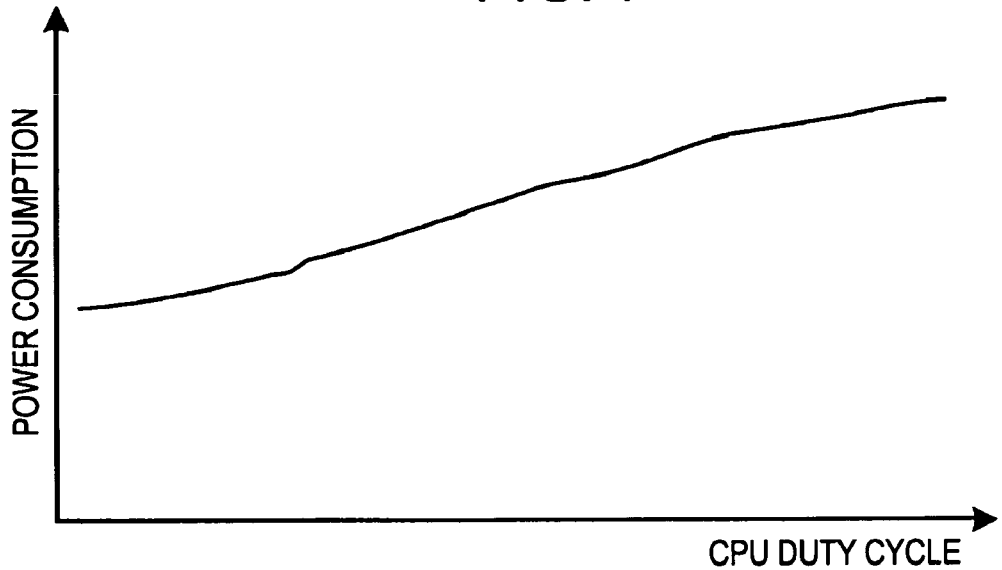
FIG. 7 is a graph depicting an example relation between a CPU operation rate and power consumption according to an example of an embodiment of the present invention.

FIG. 7 is a graph depicting an example relation between the CPU duty cycle and the power consumption. In this graph, the abscissa represents the CPU duty cycle and the ordinate represents the power consumption. Also, the power consumption of the computer 200 corresponding to the CPU duty cycle is indicated by a solid line.

By preparing this graph with a benchmark operation using the application A, the power consumption of the group A corresponding to the CPU duty cycle may be estimated. However, the power consumption of the components other than those included in the group A (e.g., the power supply unit in the computer 200) is also included in the power consumption shown in FIG. 7. The relation between the CPU duty cycle and the power consumption minus the effect of the HDDs 204, 205 and the NIC 206 may be determined by the benchmark operation with the application A, which primarily involves using the CPU 201.

Further, a benchmark operation may be performed using the application B in which data is frequently input/output to/from the HDDs 204, 205 included in the group B. For example, a user may cause the computer 200 to execute the application B and the number of disk accesses per unit time, the CPU duty cycle and the power consumption of the computer 200 may be measured while application B is running. The CPU duty cycle and the power consumption corresponding to the number of disk accesses per unit time are acquired by gradually increasing the number of disk accesses per unit time and recording measurements.

Figure 8:
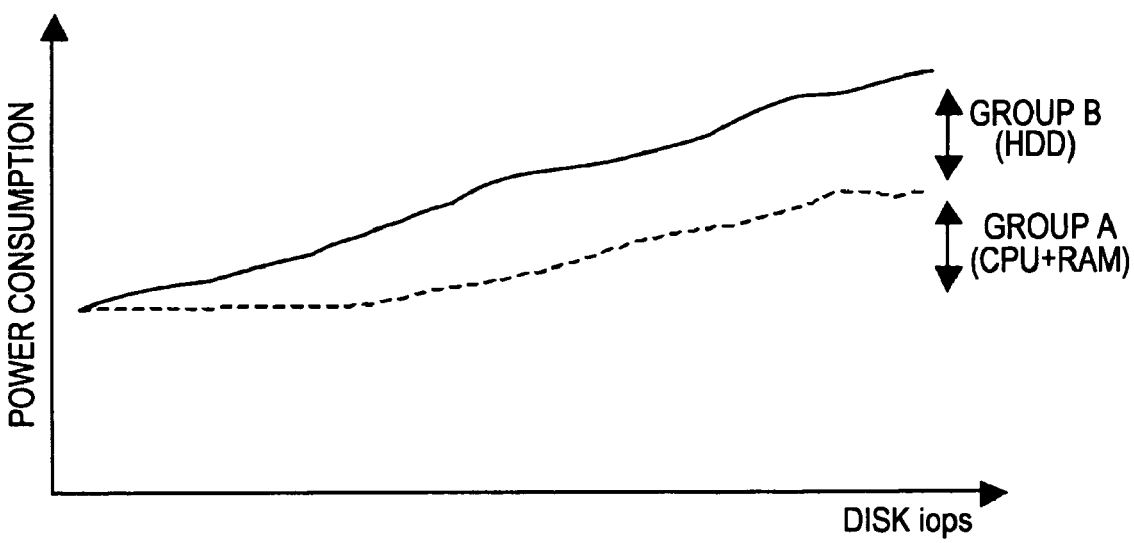
FIG. 8 is a graph depicting an example relation between a number of disk accesses per unit time and power consumption of an electric device according to an example of an embodiment of the present invention.

FIG. 8 is a graph depicting the relation between the number of disk accesses per unit time and the power consumption. In this graph, the abscissa represents the number of disk accesses per unit time (disk iops) and the ordinate represents the power consumption.

In FIG. 8, the power consumption of the computer 200 corresponding to the number of disk accesses per unit time is shown by a solid line. The dashed line in FIG. 8 depicts the determined power consumption of the group A corresponding to the number of disk accesses per unit time from the CPU duty cycle corresponding to the number of disk accesses per unit time using the relation between the CPU duty cycle and the power consumption shown in the graph of FIG. 7.

By preparing the graph in FIG. 8 with the benchmark operation using the application B b, the power consumption of the group B corresponding to the number of disk accesses per unit time may be estimated. For example, the power consumption of the group B may be determined by subtracting the power consumption of the group A from the power consumption of the computer 200. In the graph of FIG. 8, for example, the difference between the solid line and the dashed line corresponding to the number of disk accesses per unit time indicates the power consumption of the group B.

Still further, a benchmark operation using the application C in which the data communication traffic through the NIC 206 included in the group C is relatively heavy as compared with operations performed while running application A or application B. For example, a user may cause the computer 200 to execute the application C and measurements of the communication data traffic per unit time, the CPU duty cycle and the power consumption of the computer 200 while running application C are obtained. The CPU duty cycle and the power consumption corresponding to the communication data traffic per unit time are acquired by gradually increasing the communication data traffic per unit time and recording measurements.

Figure 9:
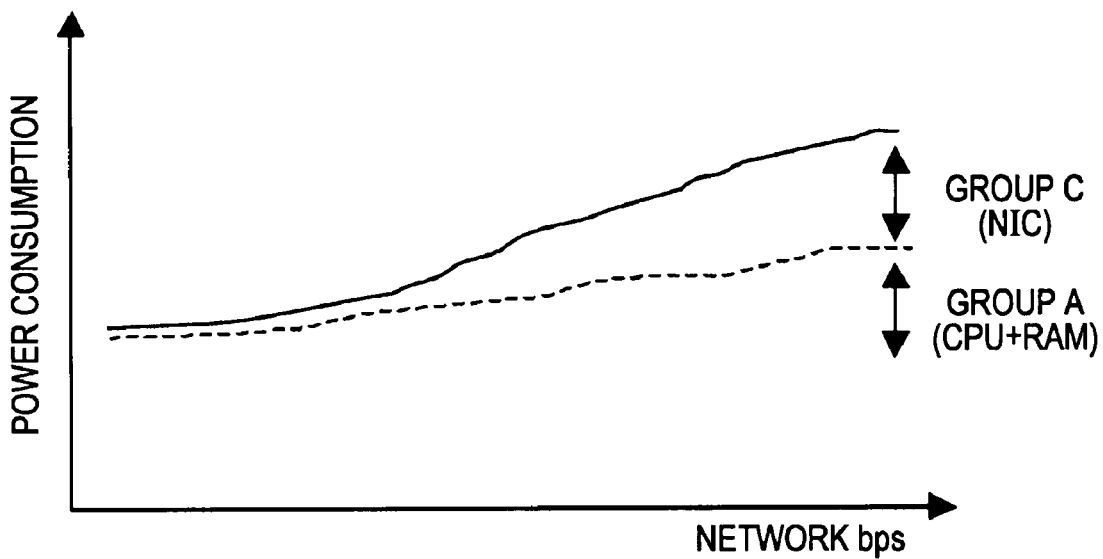
FIG. 9 is a graph depicting an example e relation between communication data traffic per unit time (bit rate) and power consumption of an electric device according to an example of an embodiment of the present invention.

FIG. 9 is a graph depicting the relation between the communication data traffic per unit time and the power consumption. In this graph, the abscissa represents the communication data traffic per unit time (network bps) and the ordinate represents the power consumption.

In FIG. 9, the power consumption of the computer 200 corresponding to the communication data traffic per unit time is shown by a solid line. Also, the relation between the CPU duty cycle and the power consumption shown in the graph of FIG. 7 may be used to determine the power consumption of the group A corresponding to the communication data traffic per unit time from the CPU duty cycle corresponding to the communication data traffic per unit time. In the graph of FIG. 9, the power consumption of the group A corresponding to the communication data traffic per unit time is shown by a dashed line.

By preparing the graph in FIG. 9 with the benchmark operation using the application C, the power consumption of the group C corresponding to the communication data traffic per unit time may be estimated. For example, the power consumption of the group C may be determined by subtracting the power consumption of the group A from the power consumption of the computer 200. In the graph of FIG. 9, for example, the difference between the solid line and the dashed line corresponding to the communication data traffic per unit time indicates the power consumption of the group C.

Further, by performing a benchmark operation with application D causing IO access to the RAID 210. For example, measurements of the number of accesses per unit time (one second) and the power consumption of the RAID 210 may be measured while running application D. In the process, the power consumption corresponding to the number of disk accesses per unit time may be acquired by gradually increasing the number of disk accesses per unit time and obtaining measurements.

Figure 10:
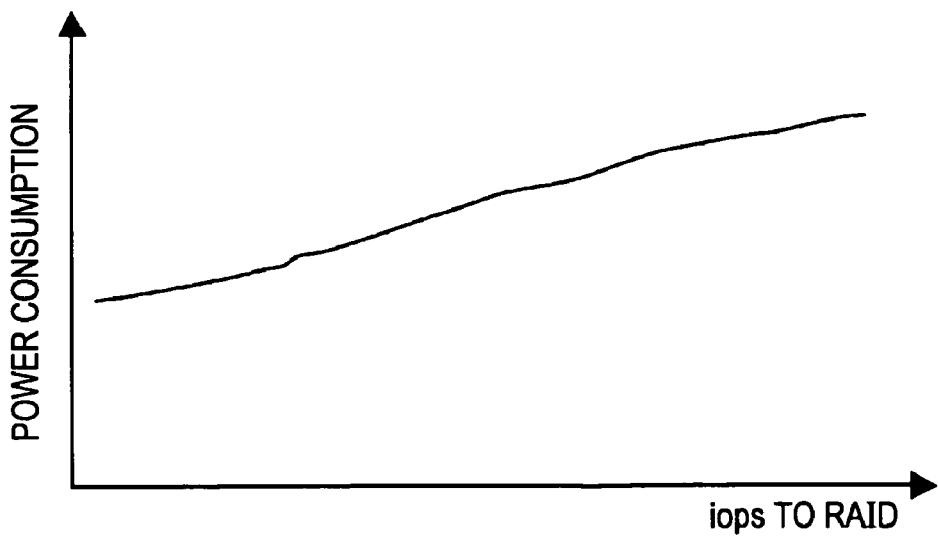
FIG. 10 is a graph depicting an example relation between a number of accesses to a RAID (Redundant Array of Independent Disks) per unit time and the power consumption of an electric device according to an example of an embodiment of the present invention.

FIG. 10 is a graph depicting the relation between the number of accesses to the RAID per unit time and the power consumption. In this graph, the abscissa represents the number of accesses to the RAID 210 per unit time (iops of the RAID) and the ordinate represents the power consumption. Also, the power consumption of the computer 200 corresponding to the number of accesses to the RAID 210 per unit time is shown by a solid line.

Based on the results of the benchmark operations shown in FIGS. 7 to 10, the power consumption estimation information may be obtained. For example, the CPU power consumption conversion table 111, the built-in disk power consumption conversion table 112, the RAID power consumption conversion table 113 and the NIC power consumption conversion table 114 may be prepared by a user.

FIG. 11 is an example of a CPU power consumption conversion table 111. The CPU power consumption conversion table 111 includes a CPU duty cycle column and a power consumption column. The CPU duty cycle (in %) is set in the CPU duty cycle column. In the power consumption column, on the other hand, the power consumption (in watt) of the group A including the CPU 201 for the corresponding CPU duty cycle is set. This relation of correspondence may be set with reference to the graph of FIG. 7, for example.

FIG. 12 is an example of a built-in disk power consumption conversion table 112. The built-in disk power consumption conversion table 112 includes a column of the number of disk accesses per unit time and a power consumption column. In the column of the number of accesses per unit time, the number of accesses per unit time (disk iops) for the HDDs 204, 205 is set. In the power consumption column, on the other hand, the power consumption (in watt) of the group B including the HDDs 204, 205 for the corresponding number of accesses per unit time is set. This relation of correspondence may be set with reference to the graph of FIG. 8, for example.

FIG. 13 is an example of a RAID power consumption conversion table 113. The RAID power consumption conversion table 113 includes a column of the number of accesses per unit time and a power consumption column. The column of the number of accesses per unit time has set therein the number of accesses to the RAID 210 per unit time (iops of the RAID). The power consumption column, on the other hand, has set therein the power consumption (in watt) of the RAID 210 for the corresponding number of accesses to the RAID 210 per unit time. This relation of correspondence may be set with reference to the graph of FIG. 10, for example.

FIG. 14 is an example of a NIC power consumption conversion table 114. The NIC power consumption conversion table 114 includes a column of the communication data traffic per unit time and a power consumption column. In the column of the communication data traffic per unit time, the communication data traffic per unit time (in Mbps) through the NIC 206 is set. In the power consumption column, on the other hand, the power consumption (in watt) of the group C including NIC for the corresponding communication data traffic per unit time is set. This relation of correspondence may be set with reference to the graph of FIG. 9, for example.

Each of these power consumption conversion tables may be stored in the power consumption estimation information storage unit 110. For example, the power consumption conversion tables may be stored prior to performing a power consumption monitoring and/or control method. Also, connected device information and the maximum power consumption information may be obtained and stored in the connected device information storage unit 120 and the maximum power consumption information storage unit 130, respectively.

FIG. 15 is an example of a table including the connected device information. The connected device information 121 has set therein the identification information for uniquely identifying the devices connected to the receptacles of each power tap in correspondence with the identification information for uniquely identifying the particular power tap.

In the example of FIG. 15, the identification information "PC1" of the computer 200 is set for "Receptacle 1", and the identification information "PC2" of the computer 300 is set for "Receptacle 2" in correspondence with the identification information of the power tap 20 "Power tap 1". Also, the identification information "RAID1" of the RAID 210 is set for "Receptacle 3", and the identification information "RAID2" of the RAID 310 is set for "Receptacle 4". Also, the identification information "PC3" of the computer 400 is set for "Receptacle 1" and the identification information "PC4" of the computer 500 for "Receptacle 2" in correspondence with the identification information of the power tap 30 "Power tap 2".

FIG. 16 is an example of a table including maximum power consumption information. In the maximum power consumption information 131, the maximum power consumption (in watt) of the power tap is set in correspondence with the identification information for uniquely identifying the particular power tap. In the example of FIG. 16, the maximum power consumption "2000 W" is set in correspondence with the identification information of the power tap 20 "Power tap 1". Similarly, the maximum power consumption "2000 W" is set in correspondence with the identification information of the power tap 30 "Power tap 2". Incidentally, the value of the maximum power consumption set as the maximum power consumption information 131 is not larger than the rated power of the corresponding power tap. By setting a value smaller than the rated power of the power tap (for example, a value equal to 90% of the rated power) as the maximum power consumption, for example, the power consumption may be suppressed before the power supplied from the power tap reaches the rated power.

The power consumption may be managed for each power tap by the system configured as described above. For example, the power consumption management method may include executing an access limit process if the total power consumption of the devices connected to a power tap exceeds the maximum power consumption of the particular power tap and a function shutdown process for a faulty device upon detection of a fault.

Figure 17:
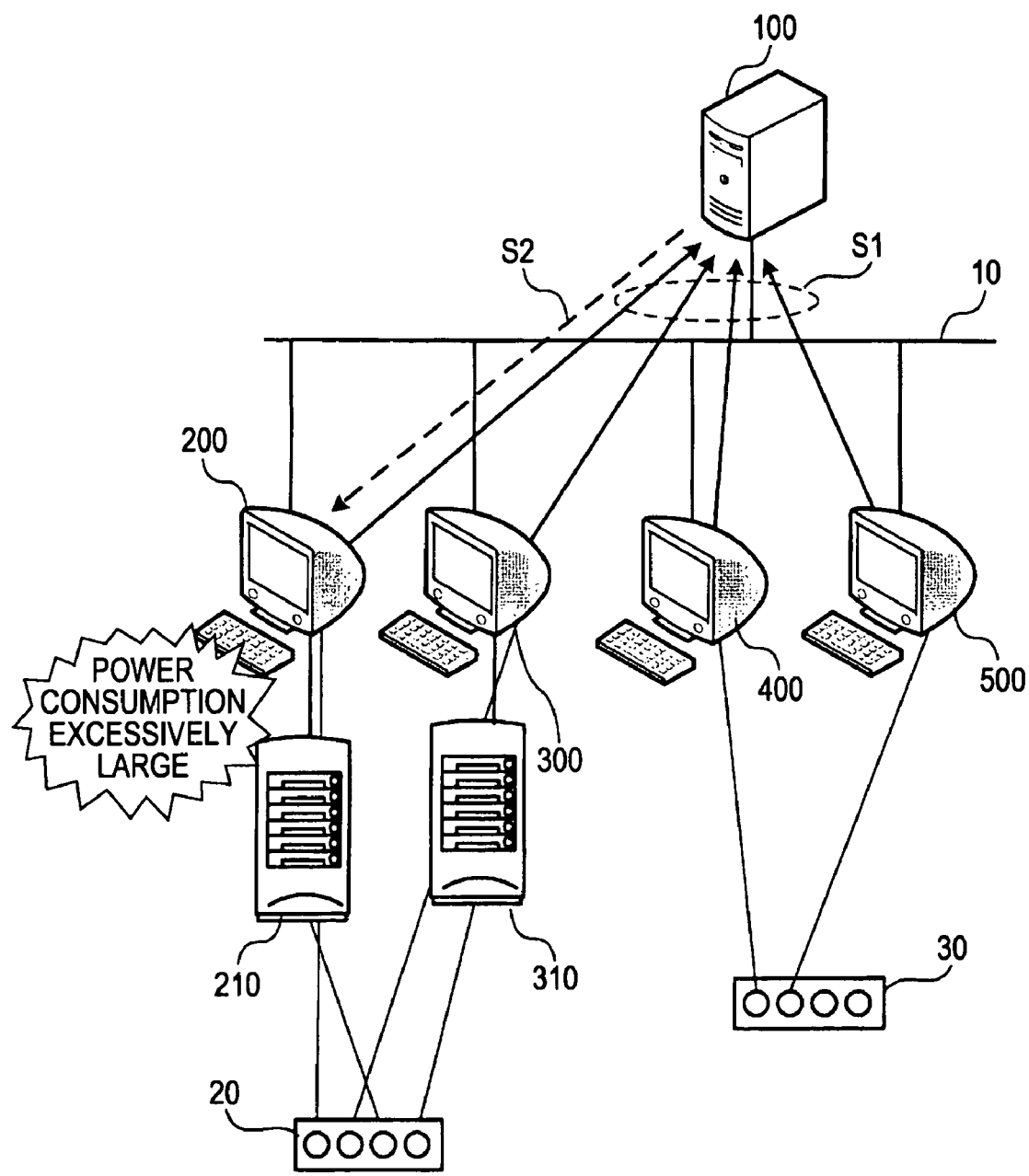
FIG. 17 depicts an access limiting process according to an example of an embodiment of the present invention.

FIG. 17 depicts an example of the access limit process. The computers 200, 300, 400, 500 transmit the load information to the power consumption monitor server 100 (S1). For example, the computer 200, 300, 400, 500 transmit load information periodically. The power consumption monitor server 100, based on the load information of the computers 200, 300, 400, 500, judges whether there is any power tap whose total power consumption has exceeded the maximum power consumption.

Assuming the load of the computer 200 is excessively heavy so that the total power consumption of the power tap 20 exceeds the maximum power consumption. In FIG. 17, an example is shown in which the power consumption monitor server 100 transmits an access limit command to the computer 200 (S2). In response to the received access limit command, the computer 200 limits the access requests processed per unit time to a specified number. As a result, the processing load of the computer 200 and the RAID 210 is reduced, and the total power consumption of the power tap 20 may be reduced.

Figure 18:
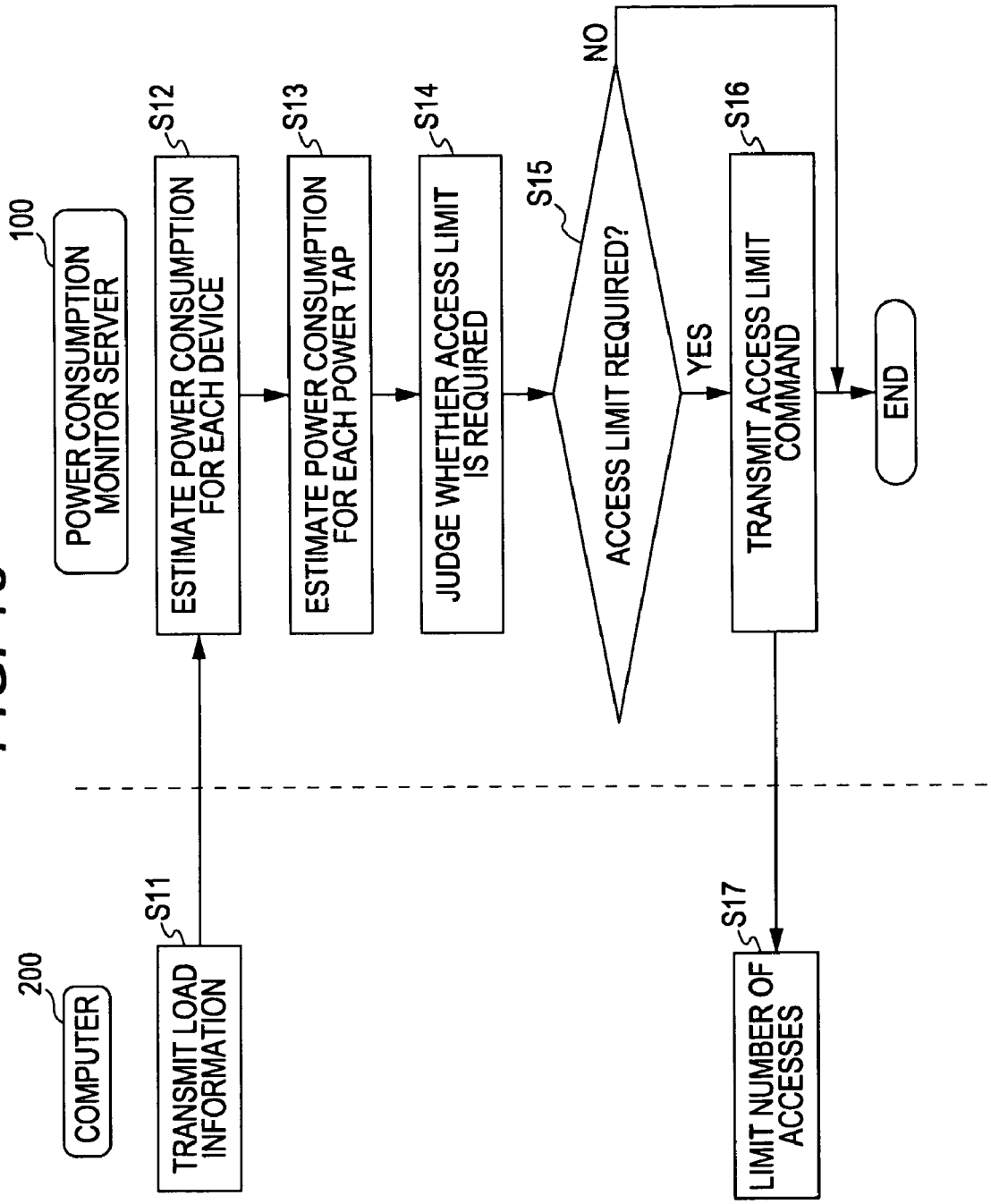
FIG. 18 depicts an access number limiting process according to an example of an embodiment of the present invention.

FIG. 18 also depicts the access number limit process. The computer 200 transmits the load information to the power consumption monitor server 100 (S11). In a similar fashion, the other computers 300, 400, 500 also transmit the load information to the power consumption monitor server 100. The load information thus transmitted is received by the load information collecting unit 140 of the power consumption monitor server 100 and delivered to the power consumption estimation unit 150.

The power consumption estimation unit 150 of the power consumption monitor server 100 estimates the power consumption for each device based on the load information received from the computers 200, 300, 400, 500 (S12). The power consumption of the computer 200 may be calculated based on the CPU duty cycle, the number of accesses to the built-in disk per unit time and the communication data traffic per unit time through the network 10.

For example, the power consumption estimation unit 150, by referring to the CPU power consumption conversion table 111, selects the smallest CPU duty cycle not smaller than the one indicated by the load information from the column of the CPU duty cycle. The power consumption corresponding to the CPU duty cycle thus selected is estimated by the power consumption estimation unit 150 as the power consumption of the CPU of the computer.

Also, the power consumption estimation unit 150, by referring to the built-in disk power consumption conversion table 112, selects the smallest number of accesses per unit time not smaller than the number of accesses to the built-in disk per unit time indicated by each load information from the column of the number of accesses per unit time. Then, the power consumption corresponding to the number of accesses per unit time thus selected is estimated by the power consumption estimation unit 150 as the power consumption of the HDD of the computer.

Further, the power consumption estimation unit 150, by referring to the NIC power consumption conversion table 114, selects the smallest communication data traffic value per unit time not smaller than the communication data traffic per unit time indicated in the load information from the column of the communication data traffic per unit time. Then, the power consumption corresponding to the communication data traffic per unit time thus selected is estimated by the power consumption estimation unit 150 as the power consumption of the NIC of the computer.

The power consumption estimation unit 150 estimates the total power consumption of the CPU, the HDD and the NIC as the power consumption of the computer, for example.

Also, the power consumption estimation unit 150, by referring to the RAID power consumption conversion table 113, selects the smallest number of accesses per unit time not less than the number of accesses to the RAID per unit time indicated by the load information from the column of the number of accesses per unit time. Then, the power consumption estimation unit 150 estimates the power consumption corresponding to the selected number of accesses per unit time as the power consumption of the RAID.

Still referring to FIG. 18, the power consumption estimation unit 150 estimates the power consumption for each power tap (S13). For example, the power consumption estimation unit 150, referring to the connected device information 121, determines the devices connected to each power tap. Then, the power consumption estimation unit 150 totalizes the power consumption of the devices connected to the power tap and estimates the power consumption for each power tap.

The power consumption estimation unit 150 judges whether the access limitation is required or not (S14). For example, the power consumption estimation unit 150, by referring to the maximum power consumption information 131, judges whether the consumption of the power supplied from each power tap has exceeded the maximum power consumption or not.

If there is any power tap of which the maximum power consumption is exceeded (S15), an access limit process is performed (S16). In the absence of a power tap exceeding the maximum power consumption, on the other hand, the process is ended (S15).

The power consumption estimation unit 150 requests the access limit command unit 160 to limit the access to the computer 200 connected to the power tap supplying power exceeding the maximum power consumption (S16). For example, the power consumption estimation unit 150 selects at least one computer (the computer 200 in the example of FIG. 18), as a computer to be controlled in access, from the computers connected to the power tap supplying power exceeding the maximum power consumption. For example, the computer having the largest power consumption is selected as a computer to be controlled in access. Then, the power consumption estimation unit 150 notifies the access limit command unit 160 of the identification information of the computer 200 to be limited in access, thereby requesting the access limit command unit 160 to limit the access to the computer 200. The access limit command unit 160 transmits an access limit command to limit the number of accesses, to the computer 200 designated by the identification information to be limited in access.

The access limiter 230 of the computer 200, in response to an access limit command, limits the number of access requests processed per unit time (S17). In this way, once the power supplied from a power tap exceeds the maximum power consumption, the access to the computer connected to the particular power tap is limited. As a result, the processing load of the computer is reduced resulting in less power consumption. Specifically, the power consumption of the electric devices connected to the power tap which changes with time may be accurately estimated, and the total power consumption of the electric devices may be suppressed to a value not higher than the maximum power consumption of the power tap.

This control operation inhibits and/or prevents the power actually supplied from a power tap from exceeding the rated power even in the case where the total of the maximum rated power of the devices connected to the particular power tap exceeds the rated power of the power tap. In other words, even if the total of the maximum rated power of the devices exceeds the rated power of the power tap, the particular devices may be operated by being connected to the particular power tap. As a result, multiple devices may be operated without adding to the power equipment.

The access limitation imposed on the computer may be canceled when the power consumption of the power tap connected with the computer is reduced to a certain level. For example, the information as to whether the access limit command has been sent to each computer is stored by the access limit command unit 160 in the storage area of the RAM, and once the power supplied from a power tap connected with the computer limited in access is reduced to a specified value or less (for example, 80% or less of the maximum power consumption), a command to cancel the access limitation is transmitted from the access limit command unit 160 to the computer limited in access. The computer that has received the command cancels the access limitation.

Figure 19:
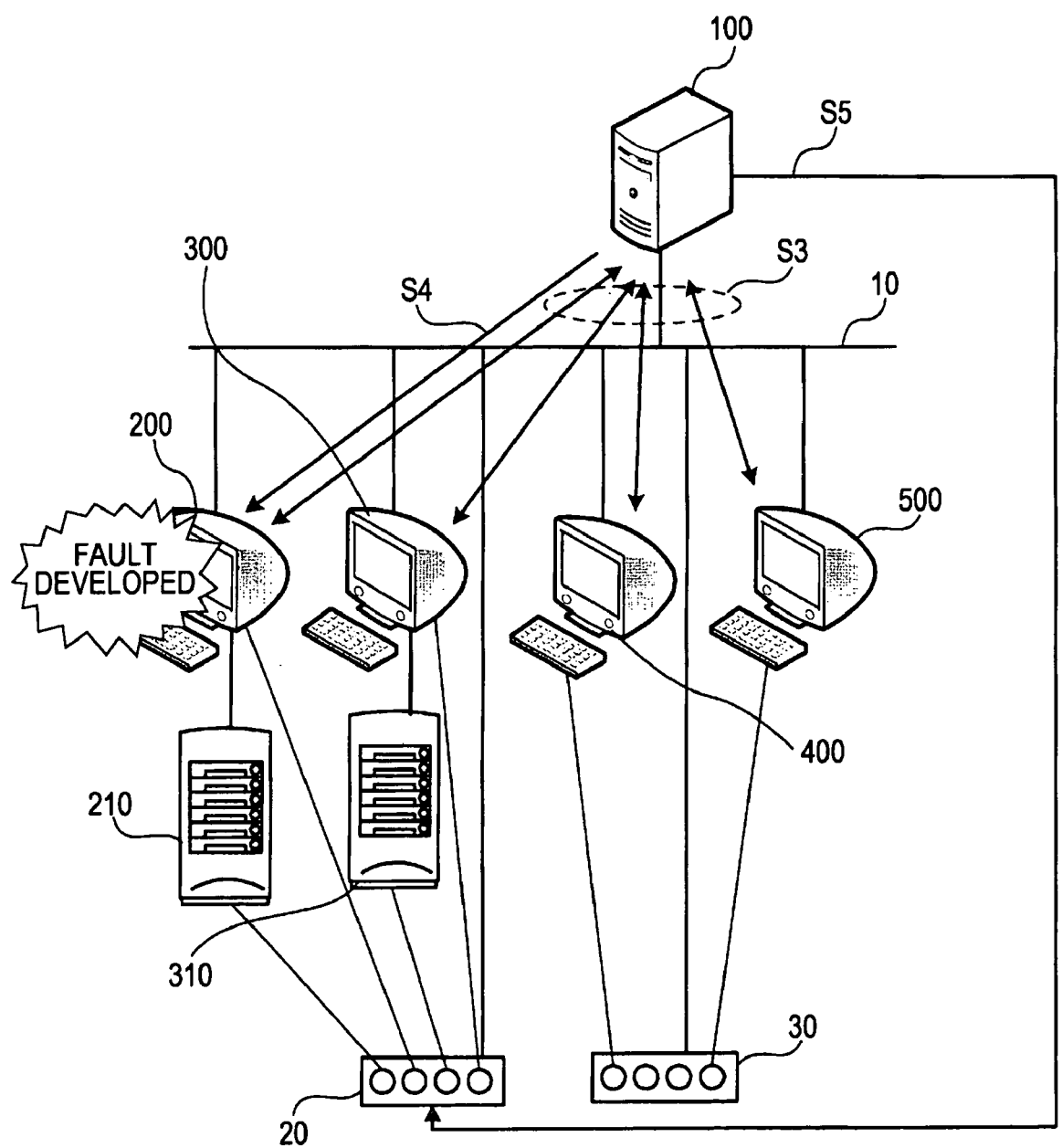
FIG. 19 depicts a function shutdown process for a faulty device according to an example of an embodiment of the present invention.

Next, the process of shutting down the function of a faulty device is explained. FIG. 19 depicts an example of the process of shutting down operations of a faulty device. The power consumption monitor server 100 monitors the state of the computers 200, 300, 400, 500 and judges whether any of the computers has developed a fault (S3). A computer which has failed to transmit the load information for a specified period of time, for example, may be judged as having developed a fault. As an alternative, a command (for example, a ping) to confirm the connection is periodically transmitted to the computers 200, 300, 400, 500 from the power consumption monitor server 100, and any computer having failed to transmit a response for a specified period of time may be judged as having developed a fault. As another alternative, the computers 200, 300, 400, 500 are caused to transmit a heart beat signal periodically to the power consumption monitor server 100, and any computer having failed to transmit the heart beat signal for a specified time may be judged as having developed a fault. As still another alternative, a computer abnormally high in CPU duty cycle or communication data traffic based on the load information may be judged as having developed a fault.

In the example of FIG. 19, the computer 200 is judged as having developed a fault. The power consumption monitor server 100 transmits an OS shutdown command to the faulty computer 200 (S4). For example, the power consumption monitor server 100 remotely logs in to the computer 200 and inputs a shutdown command to the computer 200. Once the shutdown is successful, the connection for remote log-in from the power consumption monitor server 100 to the computer 200 is forcibly cut off by the computer 200. The power consumption monitor server 100 may judge from this disconnection that the shutdown has successfully ended. Also, by using the technique of IPMI (Intelligent Platform Management Interface), the operation state of the computers 200, 300, 400, 500 may be monitored, on the one hand, and the communication with the computers 200, 300, 400, 500 with OS shut down is possible. Thus, the normal completion of the shutdown may be confirmed by confirming by IPMI that the operation system of the computer that has developed the fault is OS shut down (for example, the program of the ROM base in operation).

If the shutdown cannot be normally completed upon lapse of a specified time after issuing the shutdown command, the power consumption monitor server 100 may stop the power supply from the power tap 20 to the corresponding computer 200. For example, the power consumption monitor server 100 designates the identification number of the receptacle connected with the computer 200 and transmits a power shutoff command to the power tap 20 (S5). The power tap 20 turns off the switch connected to the designated receptacle to shut off the power supply. As a result, the power supply to the computer 200 liable to excessively consume electric power due to the fault is shut off, and the power supplied from the power tap 20 is prevented from exceeding the maximum power consumption.

Incidentally, a plurality of methods for detecting a faulty device may be used. The process of shutting down the function of a faulty device is explained below with reference to an example in which the fault judgment using the connection confirm command (for example, a ping) is combined with the fault judgment based on the load information.

In the fault judgment of the computer using the connection confirm command, the fault monitor unit 170 of the power consumption monitor server 100 manages the number of times (for example, the continuous number of response failures) the response to the connection confirm command is not received from each computer. In the fault judgment based on the load information, on the other hand, the history of the load information is managed by the fault monitor unit 170.

FIG. 20 is an example of information managed by the fault monitor unit 170. As shown in FIG. 20, the fault monitor unit 170 manages the information collected from the computers 200, 300, 400, 500 using a continuous response failure management table 171 and a load information history management table 172. The continuous response failure management table 171 and the load information history management table 172 may be stored in the memory managed by the fault monitor unit 170.

The continuous response failure management table 171 includes columns of the node name and the number of continuous response failures. The identification information of the computers 200, 300, 400, 500 are set in the node name column. In the column of the number of continuous response failures, on the other hand, the number of times (for example, the number of continuous response failures) the response has continuously failed to respond to the connection confirm command transmitted to the corresponding computer is set. The connection confirm command is transmitted to a computer and each time no response is returned, the count of the number of continuous response failures is incremented by one. In the case where the response is returned to the connection confirm command, on the other hand, the number of continuous response failures of the computer that has responded to the command is reset to "0".

In the load information history management table 172, the history of the load information for several sessions is stored. In FIG. 20, the load information history management table 172 has stored therein the CPU duty cycle and the communication data traffic per unit time for the past four sessions, among the information included in the load information. The load information history management table 172 includes the columns of the node name, the information on the immediately preceding session, the information on a second preceding session, the information on a third preceding session and the information on the fourth preceding session. The identification information of the computer is set in the node name column. The CPU duty cycle and the communication data traffic per unit time in the load information received in the immediately preceding session are set in the column of the information on the immediately preceding session. The CPU duty cycle and the communication data traffic per unit time in the load information received in the second preceding session are set in the column of the information on the immediately preceding session. The CPU duty cycle and the communication data traffic per unit time in the load information received in the third preceding session are set in the column of the information on the third preceding session. The CPU duty cycle and the communication data traffic per unit time in the load information received in the fourth preceding session are set in the column of the information on the fourth preceding session.

The process of shutting down operations of a faulty device may be executed utilizing the continuous response failure management table 171 and the load information history management table 172 described above.

Figure 21:
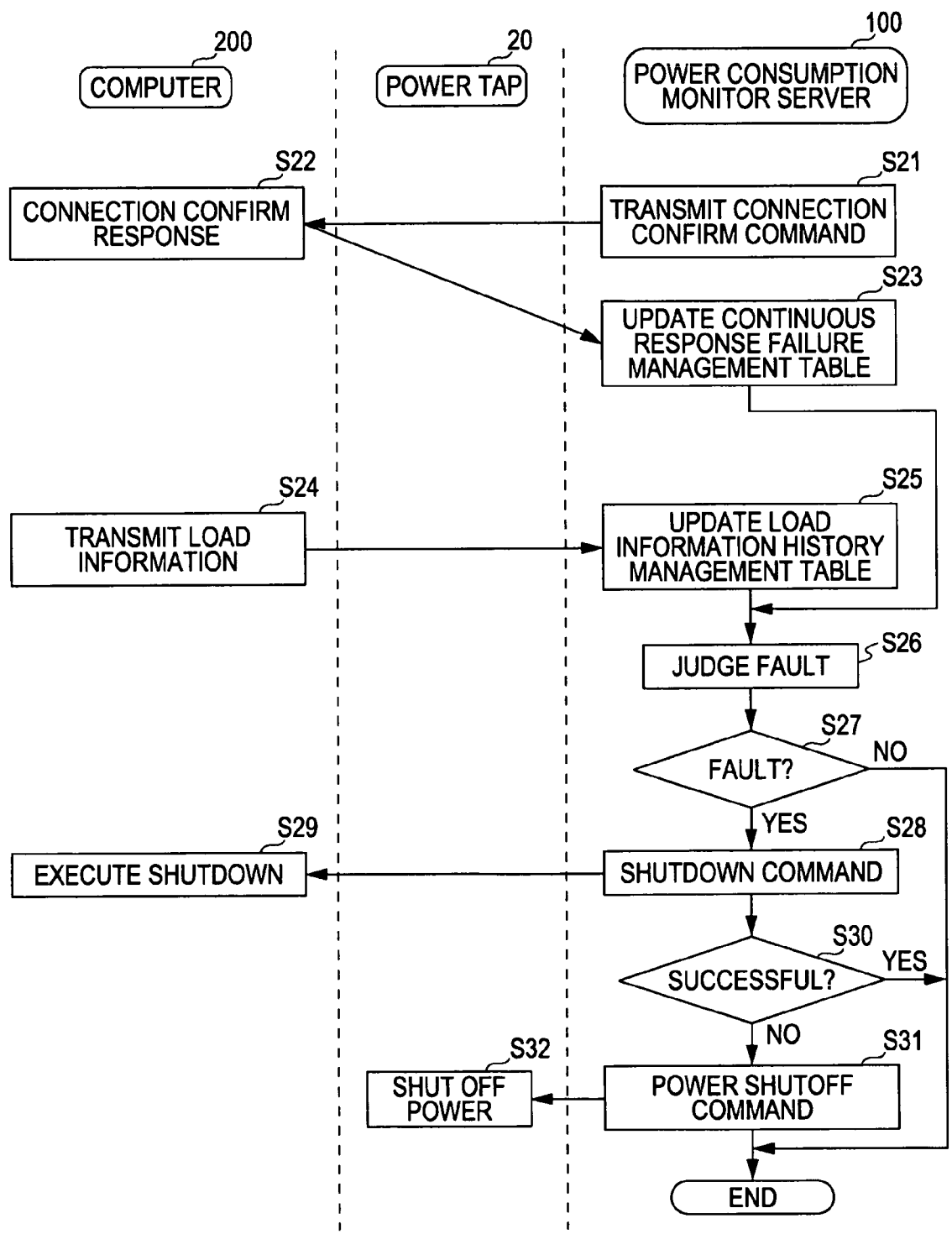
FIG. 21 depicts a shutdown process for a faulty device according to an example of an embodiment of the present invention.

FIG. 21 depicts shutting down operations of a faulty device. The fault monitor unit 170 of the power consumption monitor server 100 transmits the connection confirm command to the computer 200 (S21). The OS of the computer 200 returns a response to the connection confirm command as long as the computer 200 is in normal operation (S22).

The fault monitor unit 170 of the power consumption monitor server 100 updates the contents of the continuous response failure management table 171 in accordance with the presence or absence of the response from the computer 200 (S23). For example, if no response is returned before a specified time, the fault monitor unit 170 increments by one a value of the number of the continuous response failures for the computer 200. If the response is returned, on the other hand, the fault monitor unit 170 sets to "0" a value of the number of continuous response failures for the computer 200.

Also, the load information management unit 220 of the computer 200 transmits the load information periodically to the power consumption monitor server 100 (S24). The fault monitor unit 170 of the power consumption monitor server 100 updates the load information history management table 172 based on the load information received (S25). For example, the fault monitor unit 170 extracts the CPU duty cycle and the communication data traffic per unit time from the received load information, and registers the CPU duty cycle and the communication data traffic per unit time as the information on the immediately preceding session corresponding to the computer 200 in the load information history management table 172. The information that has been previously registered in correspondence with the computer 200 in the load information history management table 172 is moved to a column including older information.

The fault monitor unit 170 judges whether the operation of each computer is faulty or not (S26). For example, the fault monitor unit 170 refers to the continuous response failure management table 171 and judges whether there is any computer in which the number of continuous response failures has exceeded a threshold value or not. In an example in which "3" is set as the threshold value of the number of continuous response failures in the continuous response failure management table 171 having the contents shown in FIG. 20, the computer 500 of the identification information "PC4" is judged as faulty.

Also, the fault monitor unit 170 refers to the load information history management table 172 and judges whether there is any computer in which the load is excessively large. For example, the fault monitor unit 170 calculates the average of the ratio between the CPU duty cycle and the communication data traffic in the load information for the previous four sessions. Then, the fault monitor unit 170 compares the average ratios of the computers with each other, and judges any computer as faulty for which the value is higher than the other computers by a specified value or more (for example, four times). In the load information history management table 172 shown in FIG. 20, for example, the computer 300 having the identification number "PC2" has the CPU duty cycle four or more times higher in spite of the fact that the communication data traffic per unit time is substantially equal to that of the computer of the identification number "PC1". Thus, the fault monitor unit 170 judges that the computer 300 of the identification number "PC2" is faulty.

If there is any judged faulty computer as the result of the fault judgment (S27), the fault monitor unit 170 notifies the forcible shutdown control unit (S28). If there is no faulty computer, on the other hand, the process is ended.

The fault monitor unit 170 notifies the forcible shutdown control unit 180 of the identification number of the computer judged as faulty (S28). In the example of FIG. 21, the computer 200 is considered faulty. Accordingly, the forcible shutdown control unit 180 transmits a shutdown command to the computer judged as faulty.

The remote control receiving unit 240 of the computer 200 executes the OS shutdown command in response to the shutdown command (S29). The forcible shutdown control unit 180 judges whether the shutdown is completed normally or not (S30). In the case where the shutdown is normally completed, the whole process is ended. In the case where the shutdown is not normally completed, on the other hand, the forcible shutdown control unit 180 instructs the power tap 20 connected with the computer 200 to shut off the power supply of the receptacle connected with the computer 200 (S31).

The control circuit 24 of the power tap 20 shuts off the power supply to the computer 200 by turning off the switch 22a corresponding to the receptacle 21a connected with the computer 200 (S32). In this way, the computer in faulty operation due to a malfunction or the like may be forcibly shut down. A computer in faulty operation is often accompanied by increased power consumption with an abnormally high CPU duty cycle. By forcibly shutting down the computer in faulty operation, therefore, the power supplied through the power tap may be prevented from exceeding the maximum power consumption.

In addition, once the computer in faulty operation is shut down, the power that has thus far been used by the particular computer may be distributed among the other computers connected to the same power tap. In other words, the fact that a given computer is faulty may increase the number of accesses to the other computers, probably resulting in an increased power consumption of the other computers. Also, by shutting down the operation of the faulty computer, electric energy usable by the computers in normal operation (connected to the same power tap as the shutdown computer) may be increased. As a result, the computers in normal operation may exhibit improved and/or the maximum processing capability in processing the access requests.

As described above, the electric power supplied from a power tap may be prevented from becoming excessively large by forcibly shutting down a computer judged as faulty. In the case where the faulty computer is forcibly shut down, however, the data stored in the RAID connected to the particular computer may not be able to be accessed from the other computers. In view of this, a distributed storage system with the data stored in duplex form may be used to manage data with a plurality of computers. In this way, the operation of the system as a whole may be continued even in the case where any one of the computers is forcibly shut down.

Figure 22:
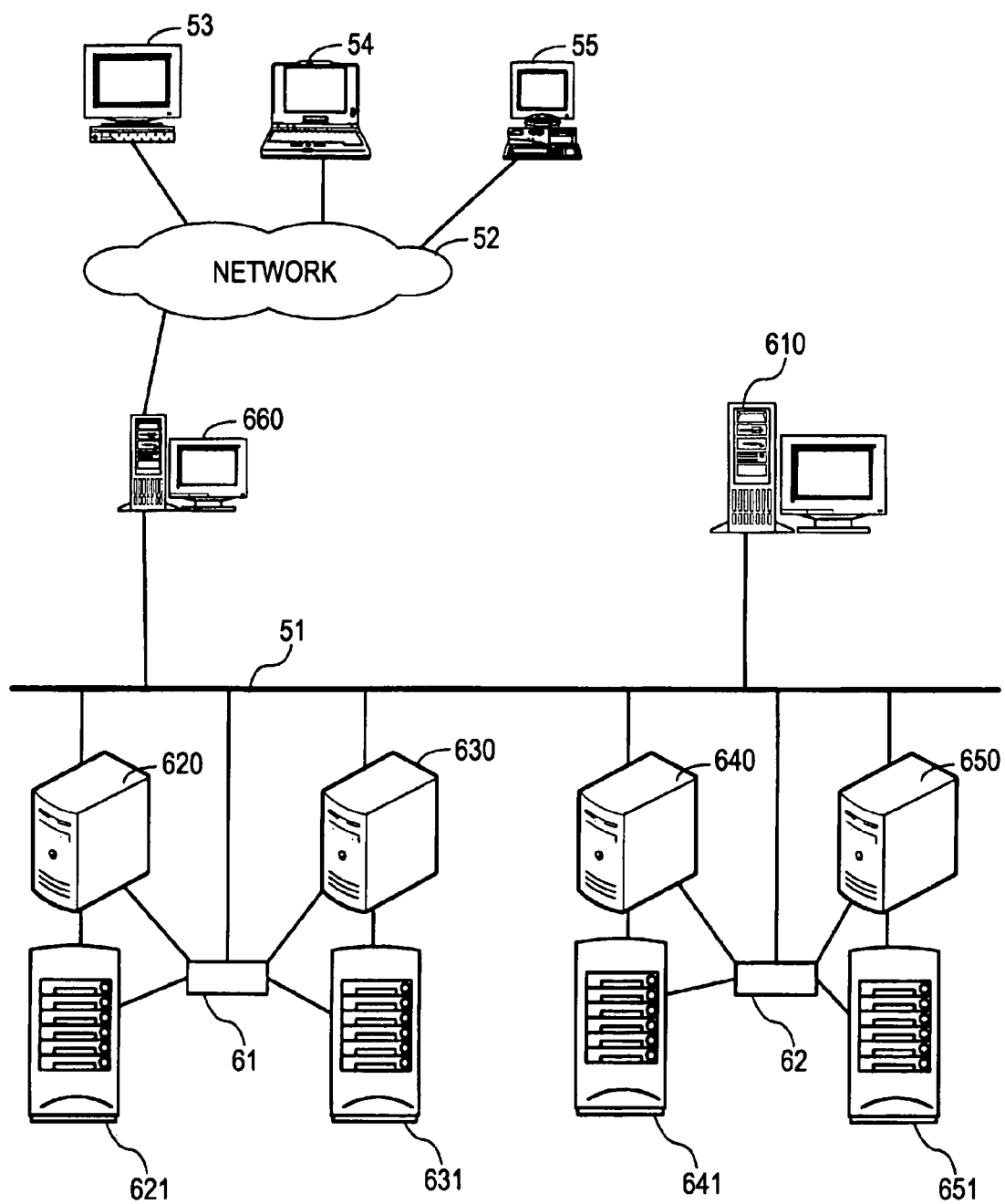
FIG. 22 depicts a distributed storage system according to an example of an embodiment of the present invention.

FIG. 22 depicts a distributed storage system. In FIG. 22, a plurality of disk nodes 620, 630, 640, 650, a control node 610, an access node 660 and power taps 61, 62 are connected through a network 51. The RAIDs 621, 631, 641, 651 are connected with the disk nodes 620, 630, 640, 650, respectively.

A plurality of hard disk drives (HDD) are packaged in each of the RAIDs 621, 631, 641, 651. Each of the RAIDs 621, 631, 641, 651 is a RAID system using built-in HDDs. Further, each of the RAIDs 621, 631, 641, 651 provide the disk management service of RAID5.

The disk nodes 620, 630, 640, 650 may each be a computer having the architecture called IA (Intel Architecture), for example. The disk nodes 620, 630, 640, 650 manage data stored in the RAIDs 621, 631, 641, 651 connected thereto and provide the data being managed to the terminal devices 53 to 55 through the network 51. Also, the disk nodes 620, 630, 640, 650 manage the data having a redundancy. In other words, the same data is managed by at least two disk nodes.

The plug receptacles of the power tap 61 are connected with the disk nodes 620, 630 and the RAIDs 621, 631. The plug receptacles of the power tap 62, on the other hand, are connected with the disk nodes 640, 650 and the RAIDs 641, 651. The power taps 61, 62 may switch on/off the power supply to the receptacles in accordance with a command through the network 51.

The control node 610 manages the disk nodes 620, 630, 640, 650. The control node 610, for example, may be registered beforehand and may store therein the information as to which power tap is connected with the disk nodes 620, 630, 640, 650 and the RAIDs 621, 631, 641, 651. The control node 610 judges whether power supplied to each power tap exceeds the maximum power consumption or not. The control node 610 gives an access limit command to a disk node connected to the power tap whose power consumption is excessively large. Also, the control node 610 monitors the operation of the disk nodes 620, 630, 640, 650, and upon detection of a fault, shuts down the corresponding disk node. If the shutdown of a disk node fails, the control node 610 instructs the power tap connected with the particular disk node to shut off the power supply to the particular disk node.

The access node 660 is connected with the terminal devices 53 to 55 through the network 52. The access node 660 recognizes the place of storage of the data managed by each of the disk nodes 620, 630, 640, 650, and in response to a request from the terminal devices 53 to 55, accesses the data in the disk nodes 620, 630, 640, 650.

As shown in FIG. 22, the disk nodes 620, 630, 640, 650 are connected to the network 51, and each of the disk nodes 620, 630, 640, 650 communicates with the remaining disk nodes. This multinode storage system functions as a virtual volume (hereinafter referred to as the logic volume) for the terminal devices 53 to 55.

Figure 23:
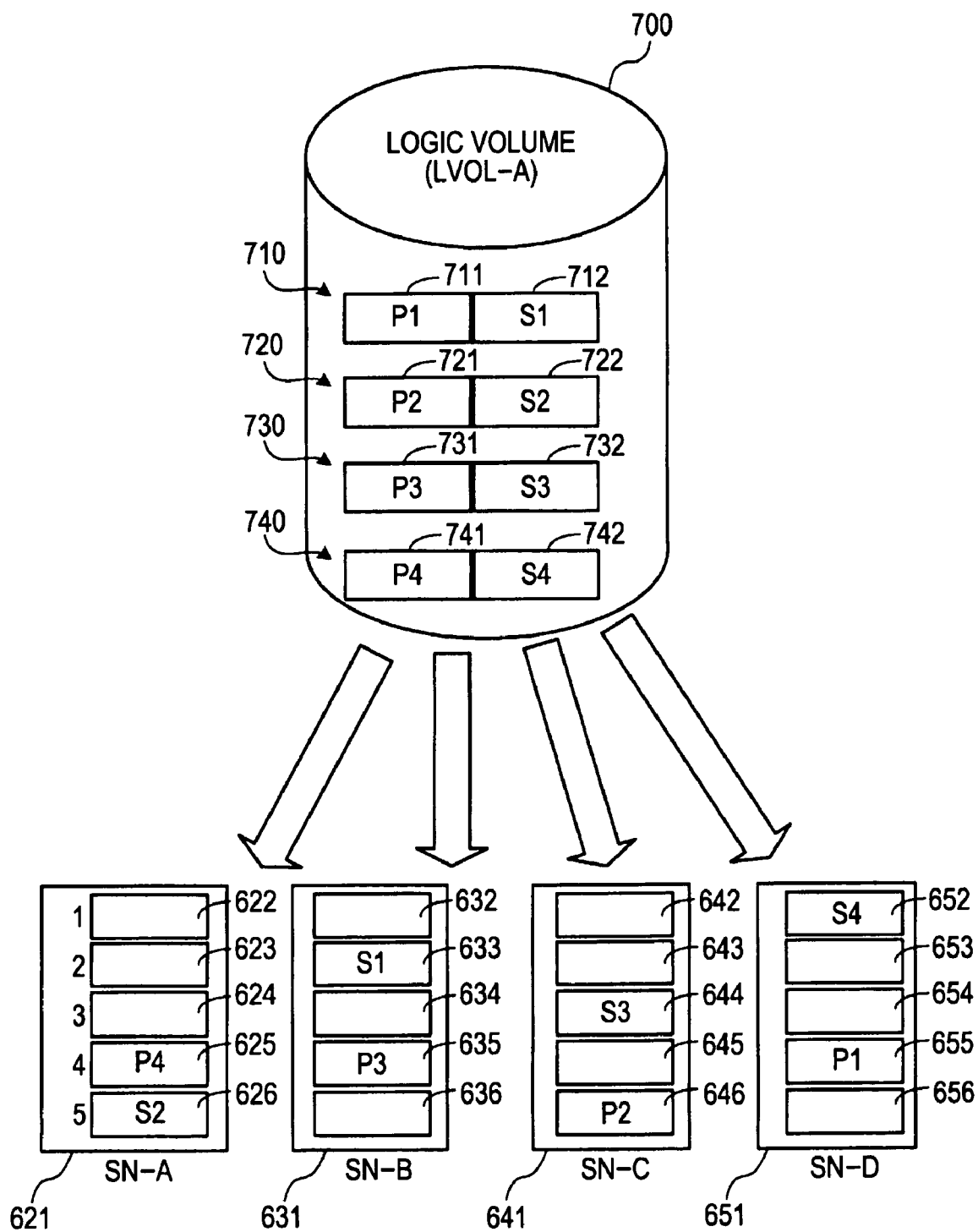
FIG. 23 depicts an example data structure of a logic volume according to an example of an embodiment of the present invention.

FIG. 23 is a diagram showing the data structure of the logic volume. The logic volume 700 may be assigned a logic volume identifier called "LVOL-A". Also, the four disk nodes 620, 630, 640, 650 connected through the network are assigned the node identifiers "SN-A", "SN-B", "SN-C", "SN-D", respectively, to identify the individual disk nodes.

The logic disk of RAID 5 is constructed in each of the RAIDs 621, 631, 641, 651 included in the disk nodes 620, 630, 640, 650, respectively. Each logic disk is divided into five slices and managed in each disk node, for example.

In FIG. 23, for example, the storage area in the RAID 621 is divided into five slices 622 to 626, and the storage area in the RAID 631 is divided into five slices 632 to 636. Similarly, the storage area in the RAID 641 is divided into five slices 642 to 646, and the storage area in the RAID 651 is divided into five slices 652 to 656.

Incidentally, in FIG. 23, the logic volume 700 is configured of segments 710, 720, 730, 740 as units. The storage capacity of the segments 710, 720, 730, 740 may be equal to that of the slices constituting units of management in the RAIDs 621, 631, 641, 651, for example. Assuming that the storage capacity of the slice is one gigabyte, for example, the storage capacity of the segment is also one gigabyte. The storage capacity of the logic volume 700 is an integer multiple of the storage capacity of one segment. If the storage capacity of the segment is one gigabyte, for example, the storage capacity of the logic volume 700 is four gigabytes.

The segments 710, 720, 730, 740 include sets of primary slices 711, 721, 731, 741 and secondary slices 712, 722, 732, 742, respectively. The slices associated with the same segment belong to different disk nodes. Each slice is managed by the slice management information. The slice management information may include a logic volume identifier, segment information, slice information making up the segment and a flag indicating the primary slice or the secondary slice, for example.

In the case of FIG. 23, for example, the identifier for identifying the slice attribute is designated by a letter "P" or "S" and a numerical value. "P" indicates the primary slice, and "S" the secondary slice. The numerical value following the letter indicates the segment number with which the slice is associated. The primary slice of the first segment 710, for example, is indicated by "P1" and the secondary slice by "S1".

Each of the primary and secondary slices of the logic volume 700 of this structure corresponds to any one of the slices in the RAIDs 621, 631, 641, 651. The primary slice 711 of the segment 710, for example, corresponds to the slice 655 of the RAID 651, and the secondary slice 712 corresponds to the slice 633 of the RAID 631. The RAIDs 621, 631, 641, 651 each store the data on the primary or secondary slice corresponding to the slice of itself.

Each disk node holds, as the slice management information, the information such as the segment assigned the slice to be managed by itself. The control node 610 collects the slice management information from each disk node at the time of starting the system, and holds it in memory. Also, the slice management information collected is delivered from the control node 610 to the access node 660. The access node 660, by referring to the acquired slice management information, may recognize to which disk node the access request is to be transmitted when accessing the data in an arbitrary segment of the logic volume 700.

Figure 24:
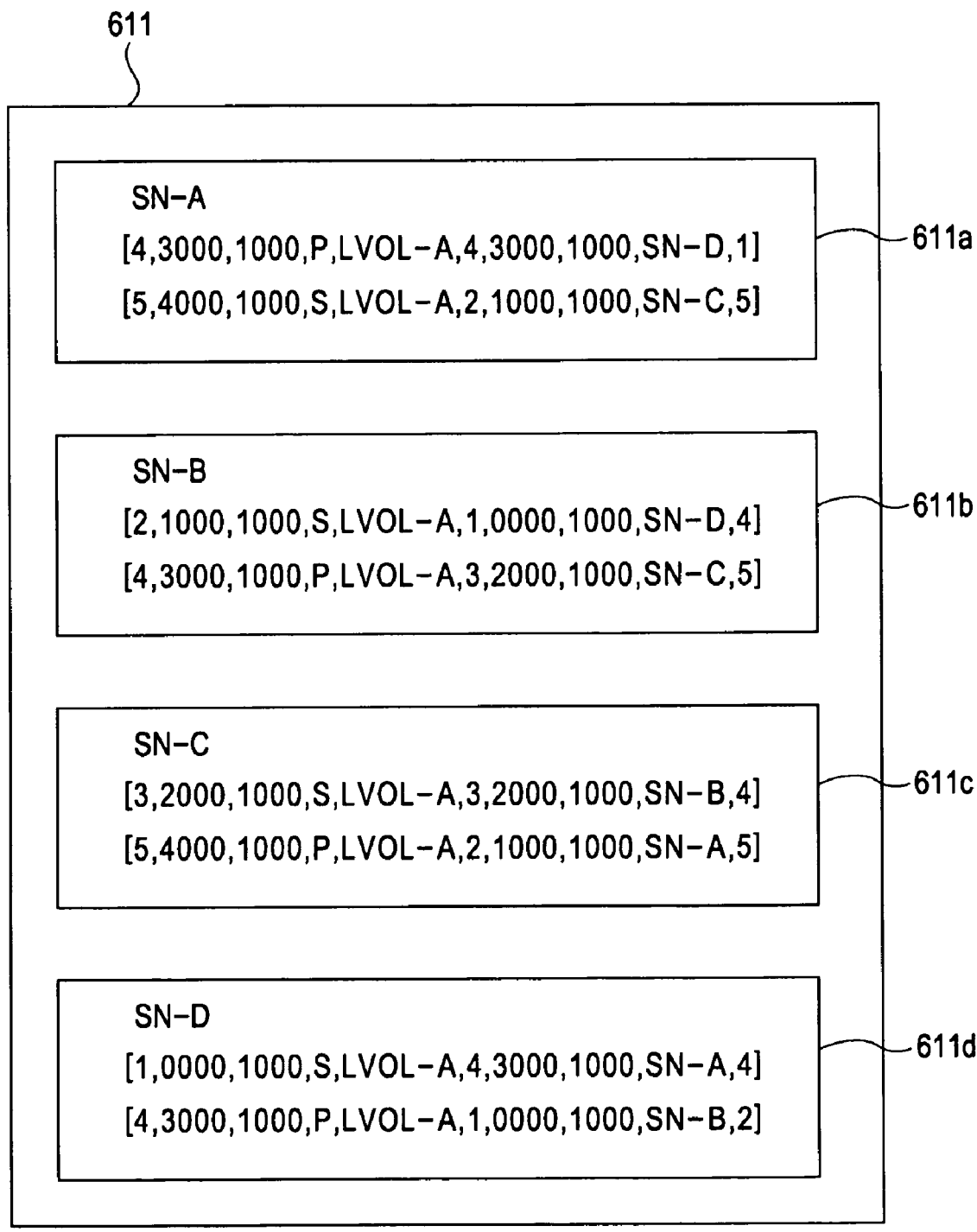
FIG. 24 depicts an example data structure of a slice management information group held in the control node according to an example of an embodiment of the present invention.

FIG. 24 depicts an example of a data structure of a slice management information group held in the control node 610. The control node 610 uses at least a part of the storage area of the RAM as a slice management information group storage unit 611. The slice management information group storage unit 611 stores a plurality of slice management information 611a, 611b, 611c, 611d.

The components of the slice management information 611a, 611b, 611c, 611d are identified below in the order from the left or right of FIG. 24.

Slice number
Start block position (number of the block corresponding to the head of the corresponding slice)
Number of blocks (number of blocks in slice)
Flag (primary or secondary)
Logic volume identifier
Segment number
Logic volume start block position
Number of blocks in logic volume
Disk node identifier paired with slice number The slice management information 611a, 611b, 611c, 611d shown in FIG. 24 are included in the logic volume 700 depicted in FIG. 23. The slice of slice number "4" in the slice management information 611a of node identifier "SN-A", for example, is the primary slice of segment number "4" of "LVOL-A", and paired with the slice of slice number "1" of "SN-D".

The slice management information 611a, 611b, 611c, 611d shown in FIG. 24 are collected from the disk nodes 620, 630, 640, 650, respectively.

The structure of the logic volume may be recognized in the control node 610 with the slice management information 611a, 611b, 611c, 611d. If the slices allocated to the segments of the logic volume 700 are changed, the particular control node 610 determines the allocation change and notifies the result to each disk node and each access node.

Also, the disk nodes 620, 630, 640, 650, having the slice management information, may recognize the disk node for managing the corresponding secondary slice if the primary slice is managed by itself.

In the case where the power consumption monitor system is included in the distributed storage system, each unit in the power consumption monitor server 100 (see FIG. 5 may be included in the control node 610 shown in FIG. 22. Also, each unit in the computer 200 shown in FIG. 5 may be included in the disk nodes 620, 630, 640, 650, respectively.

As a result, the load information may be collected by the control node 610 from the disk nodes 620, 630, 640, 650 to estimate the power supply amount through the power taps 61, 62, for example. The control node 610 may determine the total power consumption for each power tap. The control node 610, upon detection of a power tap with an excessively large total power supply (e.g., equal to or greater than a specified maximum power consumption), transmits an access number limit command to the disk node connected to the particular power tap. Then, the number of accesses processed per unit time in the disk node is limited to a specified number or less. The access node 660, in transmitting the access request to the disk node, holds the next access request in a queue until the particular access request is completely processed. If the number of accesses to be processed per unit time is limited in the disk node, the number of access requests transmitted from the access node 660 to the corresponding disk node per unit time is limited. As a result, the processing load of the disk node is reduced and the power consumption is reduced.

Incidentally, in the case where the data in the primary slice is updated in the distributed storage system, the data in the corresponding secondary slice should also be updated. For example, in the case where the data is accessed from the access node 660, an access request is given to the disk node managing the primary slice. As long as the particular access request includes updated data, the disk node that has received the access request updates the data in the primary slice managed by itself, while at the same time requesting the disk node managing the corresponding secondary slice to update the data. The disk node that has received the request updates the corresponding data in the secondary slice.

In an example where the number of accesses is limited in the disk node managing the secondary slice, assume that the access for data updating to secure the identity of the data from the disk node managing the primary slice is also limited. In this example, the access limitation would likely have an effect on other disk nodes. In an example where the number of accesses is limited by the disk node, therefore, only the access request from the access node 660 may be limited. As a result, the data update request for securing the data identity from other disk nodes may be quickly processed even during the time when the number of accesses is limited.

Also, the control node 610, upon detection of a disk node faulty in operation, shuts down the particular disk node if possible. In the case where the shutdown of the disk node cannot be normally completed, the control node 610 causes the power tap connected with the particular disk node to shut off the power supply to the particular disk node. If the disk node operations are shut down in this way, the data managed by the particular disk node may be transferred to other disk nodes.

FIG. 25 depicts a data restoration process upon occurrence of a fault. In the example of FIG. 25, a fault is detected in the disk node 620. In this example, the disk node 620 is shut down and the same data managed by the disk node 620 is stored in another disk node. For example, from the slice of another disk node allocated to the same segment as the slice managed by the disk node 620, the data is copied to the vacant slice managed by still another disk node.

In FIG. 25, for example, the fourth slice 625 of the RAID 621 connected to the disk node 620 is the primary slice of the fourth segment 740. Thus, the data of the first slice 652 of the RAID 651 (e.g., the secondary slice of the fourth segment 740) is copied to the third slice 634 of the RAID 631 of the disk node 630. Then, the slice 634 is determined as the primary slice of the fourth segment 740.

Similarly, the fifth slice 626 of the RAID 621 connected to the disk node 620 is the secondary slice of the second segment 720. Thus, the data of the fifth slice 646 of the RAID 641 (e.g., the primary slice of the second segment 720) is copied to the second slice 653 of the RAID 651 of the disk node 650. Then, the slice 653 is determined as the secondary slice of the second segment 720. In this way, the system operation may be continued even in the case where the disk node is forcibly shut down.

Incidentally, the operations described above may be implemented by a computer. In this case, a program is provided which describes operations performed the power consumption monitor server 100 and/or the control node 610. By executing this program with the computer, the operations described above are performed by the computer. The program describing the operations may be recorded in a computer-readable recording medium. Examples of a computer-readable recording medium include a magnetic recording device, an optical disk, a magnetooptic recording medium and a semiconductor memory. Examples of a magnetic recording device include a hard disk drive (HDD), a flexible disk (FD) and a magnetic tape. Examples of an optical disk include a DVD (Digital Versatile Disk), a DVD-RAM, a CD-ROM (Compact Disk Read-Only Memory) or a CD-R (Recordable)/RW (ReWritable). The magnetooptic recording medium includes a MO (MagnetoOptical disk).

In the distribution of a program, the DVD, CD-ROM and the like portable recording medium with the program recorded therein may be sold. Also, the program may be stored in the storage unit of the server computer, and may be transferred to other computers from the server computer through a network.

The computer executing the program stores in the storage unit thereof the program recorded in the portable recording medium or the program transferred from the server computer. Then, the computer reads the program from the storage unit thereof and executes the operations of a method according to the program. Incidentally, the computer may also read the program directly from the portable recording medium and execute the process according to the particular program. Also, the computer may execute the method according to the received program as required each time the program is transferred from the server computer.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

The invention claimed is:

1. A non-transitory computer-readable recording medium storing a program, which when executed by a monitoring computer that is connectable to a device that includes components, causes the monitoring computer to perform a method comprising:

storing power consumption estimation information, for each of the components of the device, indicating a relation between power consumption and processing load of a component;

acquiring load information indicating a processing load of each said component of the device, a type of the processing load to be acquired differing according to a type of the component; and estimating power consumption of the device based on the acquired load information of each said component and the power consumption estimation information of each said component, the estimating including, determining power consumption for each said component based on the acquired load information of the component and the power consumption estimation information of the component, and obtaining the power consumption of the device by summing the determined power consumption of each said component, wherein the device includes a computer that has a central processing unit (CPU), a memory, a disk unit and communication interface, and the method monitors power consumption of the computer;

the power consumption estimation information includes a CPU power consumption conversion table indicating a relation between CPU duty cycle and power consumption of the CPU and the memory, a disk power consumption conversion table indicating a relation between power consumption of the disk unit and number of disk accesses per unit time, and a communication interface power consumption conversion table indicating a relation between power consumption of the communication interface and communication data traffic per unit time;

the acquiring acquires the CPU duty cycle, the number of disk accesses per unit time and the communication data traffic per unit time as the load information of the computer; and the determining determines the power consumption of the CPU and the memory based on the acquired CPU duty cycle by referring to the CPU power consumption conversion table, the power consumption of the disk unit based on the acquired number of disk accesses per unit time by referring to the disk power consumption conversion table, and the power consumption of the communication interface based on the acquired communication data traffic per unit time by referring to the communication interface power consumption conversion table.

2. The non-transitory computer-readable recording medium according to claim 1, wherein:

the device includes another computer and an external disk unit connected to the computer;

the power consumption estimation information includes an internal disk power consumption conversion table indicating a relation between power consumption of the external disk unit and a number of accesses to the external disk unit per unit time;

the acquiring acquires, as the load information of another computer, the number of accesses to the external disk unit per unit time from the another computer; and the determining determines the power consumption of the external disk unit based on the acquired number of accesses to the external disk unit per unit time from the another computer by referring to the external disk power consumption conversion table.

3. The non-transitory computer-readable recording medium according to claim 1, wherein the method further comprises:

reducing processing load of the device when the estimated power consumption of the device is larger than a threshold value.

4. The non-transitory computer-readable recording medium according to claim 1, wherein the device includes a disk node for inputting/outputting data in accordance with an access request through a network, the device is a plurality of devices, and the method further comprises:

storing connected device information indicating a relation between the plurality of devices and at least one power tap supplying power to the plurality of devices; and limiting a number of accesses per unit time to the disk node to a specified value or less if the estimated power of the plurality of devices connected to one of the at least one power taps is larger than a threshold value.

5. The non-transitory computer-readable recording medium according to claim 1, wherein the method further comprises:

monitoring an operation of the device;

detecting a fault in the device based on the monitoring; and forcibly shutting down operation of the device in which the fault is detected.

6. The non-transitory computer-readable recording medium according to claim 5, wherein the forcible shutting down transmits a command to a power tap connected with the device in which the fault is detected to shut off the power supply to the receptacle into which a power plug of the device in which the fault is detected is inserted.

7. The non-transitory computer-readable recording medium according to claim 5, wherein the device includes a plurality of disk nodes for inputting/outputting data in accordance with an access request through a network, and the method further comprises:

storing, upon detection of a fault in any one of the disk nodes, data managed by the faulty disk node in another disk node of the disk nodes.

8. A power consumption monitor device for monitoring power consumption of a device through a network, the monitor device comprising:

a storage unit to store power consumption estimation information indicating a relation between power consumption and processing load of each component of the device;

a load information collecting unit to collect load information indicating the processing load of each said component from each said component of the device, the load information collecting unit collects a type of the processing load that corresponds to a type of the component; and a power consumption estimation unit to estimate power consumption of the device based on the collected load information and the power consumption estimation information of each said component of the device, wherein the power consumption estimation unit determines power consumption for each said component based on the collected load information for each said component and the power consumption estimation information of each said component, and obtains the power consumption of the device by summing the determined power consumption of each said component;

the device includes a computer that has a central processing unit (CPU), a memory, a disk unit and communication interface, and the power consumption of the computer is monitored;

the power consumption estimation information includes a CPU power consumption conversion table indicating a relation between CPU duty cycle and power consumption of the CPU and the memory, a disk power consumption conversion table indicating a relation between power consumption of the disk unit and number of disk accesses per unit time, and a communication interface power consumption conversion table indicating a relation between power consumption of the communication interface and communication data traffic per unit time;

the load information collecting unit collects the CPU duty cycle, the number of disk accesses per unit time and the communication data traffic per unit time as the load information of the computer; and the power consumption estimation unit determines the power consumption of the CPU and the memory based on the acquired CPU duty cycle by referring to the CPU power consumption conversion table, the power consumption of the disk unit based on the acquired number of disk accesses per unit time by referring to the disk power consumption conversion table, and the power consumption of the communication interface based on the acquired communication data traffic per unit time by referring to the communication interface power consumption conversion table.

9. The monitor device according to claim 8, wherein:
the device includes another computer and an external disk unit connected to the computer;

the power consumption estimation information includes an external disk power consumption conversion table indicating a relation between power consumption of the external disk unit and a number of accesses to the external disk unit per unit time;

the load information collecting unit collects, as the load information of the another computer, the number of accesses to the external disk unit per unit time from the another computer; and the power consumption estimation unit determines the power consumption of the external disk unit based on the collected number of accesses to the external disk unit per unit time from the another computer by referring to the external disk power consumption conversion table.

10. The monitor device according to claim 8, wherein the monitor device further comprises:
an access limit command unit to reduce processing load of the device when the estimated power consumption of the device is larger than a threshold value.

11. The monitor device according to claim 8, further comprising:
an access limit command unit to reduce the processing load of the device when the estimated power consumption of the device is larger than a threshold value, wherein
the device includes a disk node for inputting/outputting data in accordance with an access request through the network,
the device is a plurality of devices, and
the storage unit stores information indicating a relation between the plurality of devices and at least one power tap supplying power to the plurality of devices; and the access limit command unit limits a number of accesses per unit time to the disk node to a specified value or less if the estimated power of the plurality of devices connected to one of the at least one power taps is larger than a threshold value to reduce the processing load of the plurality of devices.

12. The monitor device according to claim 8, further comprising:
a fault monitor unit to monitor an operation of the device and detect a fault in any of at least one device; and
a forcible shutdown control unit to forcibly shut down operation of the device in which the fault is detected.

13. The monitor device according to claim 12,
wherein the forcible shut down control unit transmits a command to a power tap connected with the device in which the fault is detected to shut off the power supply to the receptacle into which a power plug of the device in which the fault is detected is inserted.

14. The monitor device according to claim 12, wherein
the device includes a plurality of disk nodes for inputting/outputting data in accordance with an access request through the network and, upon detection of a fault in any one of the disk nodes, data managed by the faulty disk node is stored in another disk node of the disk nodes.

15. A power consumption monitor method for a monitor computer to monitor the power consumption of a device through a network, the method comprising:
acquiring load information indicating a processing load of each component of the device, a type of the processing load to be acquired differing according to a type of the component;

calculating, by a process of the monitor computer, power consumption of each said component based on the acquired load information of the component and power consumption estimation information of the component, the power consumption estimation information indicates a relation between power consumption and processing load of each said component of the device; and summing the calculated power consumption of each said component, wherein the device includes a computer that has a central processing unit (CPU), a memory, a disk unit and communication interface, and the method monitors power consumption of the computer;

the power consumption estimation information includes a CPU power consumption conversion table indicating a relation between CPU duty cycle and power consumption of the CPU and the memory, a disk power consumption conversion table indicating a relation between power consumption of the disk unit and number of disk accesses per unit time, and a communication interface power consumption conversion table indicating a relation between power consumption of the communication interface and communication data traffic per unit time;

the acquiring acquires the CPU duty cycle, the number of disk accesses per unit time and the communication data traffic per unit time as the load information of the computer; and the calculating calculates the power consumption of the CPU and the memory based on the acquired CPU duty cycle by referring to the CPU power consumption conversion table, the power consumption of the disk unit based on the acquired number of disk accesses per unit time by referring to the disk power consumption conversion table, and the power consumption of the communication interface based on the acquired communication data traffic per unit time by referring to the communication interface power consumption conversion table.

16. A non-transitory computer-readable recording medium storing a program, when executed by a monitor computer, which causes the monitor computer to perform a method for monitoring a device, the method comprising:
    acquiring load information indicating a processing load of each component of the device, a type of the processing load to be acquired differing according to a type of the component;
    determining, by a process of the monitor computer, a power consumption of each said component based on the acquired load information of the component and power consumption estimation information of the component, the power consumption estimation information indicates a relation between a power consumption and a processing load of each said component; and
    obtaining a power consumption of the device by summing the determined power consumption of each said component, wherein
    the device includes a computer that has a central processing unit (CPU), a memory, a disk unit and communication interface, and the method monitors power consumption of the computer;
    the power consumption estimation information includes a CPU power consumption conversion table indicating a relation between CPU duty cycle and power consumption of the CPU and the memory, a disk power consumption conversion table indicating a relation between power consumption of the disk unit and number of disk accesses per unit time, and a communication interface power consumption conversion table indicating a relation between power consumption of the communication interface and communication data traffic per unit time;
    the acquiring acquires the CPU duty cycle, the number of disk accesses per unit time and the communication data traffic per unit time as the load information of the computer; and
    the determining determines the power consumption of the CPU and the memory based on the acquired CPU duty cycle by referring to the CPU power consumption conversion table, the power consumption of the disk unit based on the acquired number of disk accesses per unit time by referring to the disk power consumption conversion table, and the power consumption of the communication interface based on the acquired communication data traffic per unit time by referring to the communication interface power consumption conversion table.

* * * * *